(12) United States Patent
Lin et al.

(10) Patent No.: US 12,687,383 B2
(45) Date of Patent: Jul. 21, 2026

(54) INTERFEROMETRIC WAVEMETER FOR BROADBAND SENSORS IN PHOTONIC SYSTEMS

(71) Applicant: Intel Corporation, Santa Clara, CA (US)

(72) Inventors: Wenhua Lin, Fremont, CA (US); Boris Vulovic, Campbell, CA (US)

(73) Assignee: Intel Corporation, Santa Clara, CA (US)

( * ) Notice: Subject to any disclaimer, the term of this patent is extended or adjusted under 35 U.S.C. 154(b) by 285 days.

(21) Appl. No.: 18/463,698

(22) Filed: Sep. 8, 2023

(65) Prior Publication Data

US 2025/0035425 A1    Jan. 30, 2025

Related U.S. Application Data

(60) Provisional application No. 63/515,885, filed on Jul. 27, 2023.

(51) Int. Cl.
| | |
|---|---|
| *G01B 9/02015* | (2022.01) |
| *G01B 9/02* | (2022.01) |
| *G01J 9/02* | (2006.01) |
| *G02F 1/21* | (2006.01) |
| *G02F 1/225* | (2006.01) |

(52) U.S. Cl.
CPC ..... *G01B 9/02027* (2013.01); *G01B 9/02051* (2013.01); *G01J 9/0246* (2013.01); *G02F 1/212* (2021.01); *G02F 1/225* (2013.01); *G01J 2009/0288* (2013.01)

(58) Field of Classification Search
CPC ............. G01B 9/02027; G01B 9/02051; G01J 9/0246; G01J 2009/0288; G02F 1/212; G02F 1/225
See application file for complete search history.

(56) References Cited

U.S. PATENT DOCUMENTS

| | | | | |
|---|---|---|---|---|
| 6,462,827 | B1 | 10/2002 | Frankel | |
| 10,900,838 | B1 * | 1/2021 | Podmore | G01J 3/1895 |
| 2002/0030818 | A1 * | 3/2002 | Ruck | G01J 9/00 |
| | | | | 356/402 |
| 2020/0182702 | A1 | 6/2020 | Seeley et al. | |
| 2022/0137298 | A1 | 5/2022 | Yao | |
| 2022/0365400 | A1 * | 11/2022 | Zeiler | G02F 1/212 |

(Continued)

FOREIGN PATENT DOCUMENTS

| | | |
|---|---|---|
| WO | 2018175524 A1 | 9/2018 |

*Primary Examiner* — Michael A Lyons
(74) *Attorney, Agent, or Firm* — Akona IP PC

(57) ABSTRACT

Disclosed herein are embodiments of a broadband wavemeter system comprising: a laser source to generate an optical signal having one or more wavelengths; a tap to separate a portion of the optical signal from the laser source; a splitter to split an incoming optical signal from the tap into a plurality of outgoing optical signals; a plurality of wavemeters, each one in the plurality to receive one of the outgoing optical signals from the splitter, in which each wavemeter in the plurality of wavemeters comprises a Mach-Zehnder Interferometer (MZI), and each wavemeter has at least one of free spectral range (FSR) detuning and center wavelength detuning, and a control circuit to collate outputs from individual ones of the plurality of wavemeters to monitor, detect and control the laser source.

20 Claims, 13 Drawing Sheets

(56)　　　　　　　References Cited

U.S. PATENT DOCUMENTS

| | | | |
|---|---|---|---|
| 2023/0307887 A1* | 9/2023 | Stern | H01S 5/0218 |
| 2023/0341266 A1* | 10/2023 | Lee | G01J 3/45 |
| 2024/0175672 A1* | 5/2024 | Ehrlichman | G01B 9/02083 |

* cited by examiner

INTERFEROMETRIC WAVEMETER FOR BROADBAND SENSORS IN PHOTONIC SYSTEMS

CROSS-REFERENCE TO RELATED APPLICATION

This application claims the benefit of priority under 35 U.S.C. § 119(e) to U.S. Provisional Patent Application Ser. No. 63/515,885 filed on Jul. 27, 2023, entitled INTERFEROMETRIC WAVEMETER FOR BROADBAND SENSORS IN PHOTONIC SYSTEMS. The disclosure of the prior Application is considered part of and is incorporated by reference in the disclosure of this Application.

BACKGROUND

The present subject matter relates to microelectronics and photonics systems. More specifically, the present disclosure relates to silicon photonic systems such as those used with light detection and ranging (LIDAR) sensors, biosensors and such other optical sensors. Such silicon photonic systems include many optical components such as a trans-impedance amplifier, laser drivers, optical switches, semiconductor optical amplifiers, radio frequency modulators, splitter-combiners, etc. The systems may include both electrical integrated circuits (EICs) as well as photonic integrated circuits (PICs).

BRIEF DESCRIPTION OF THE FIGURES

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
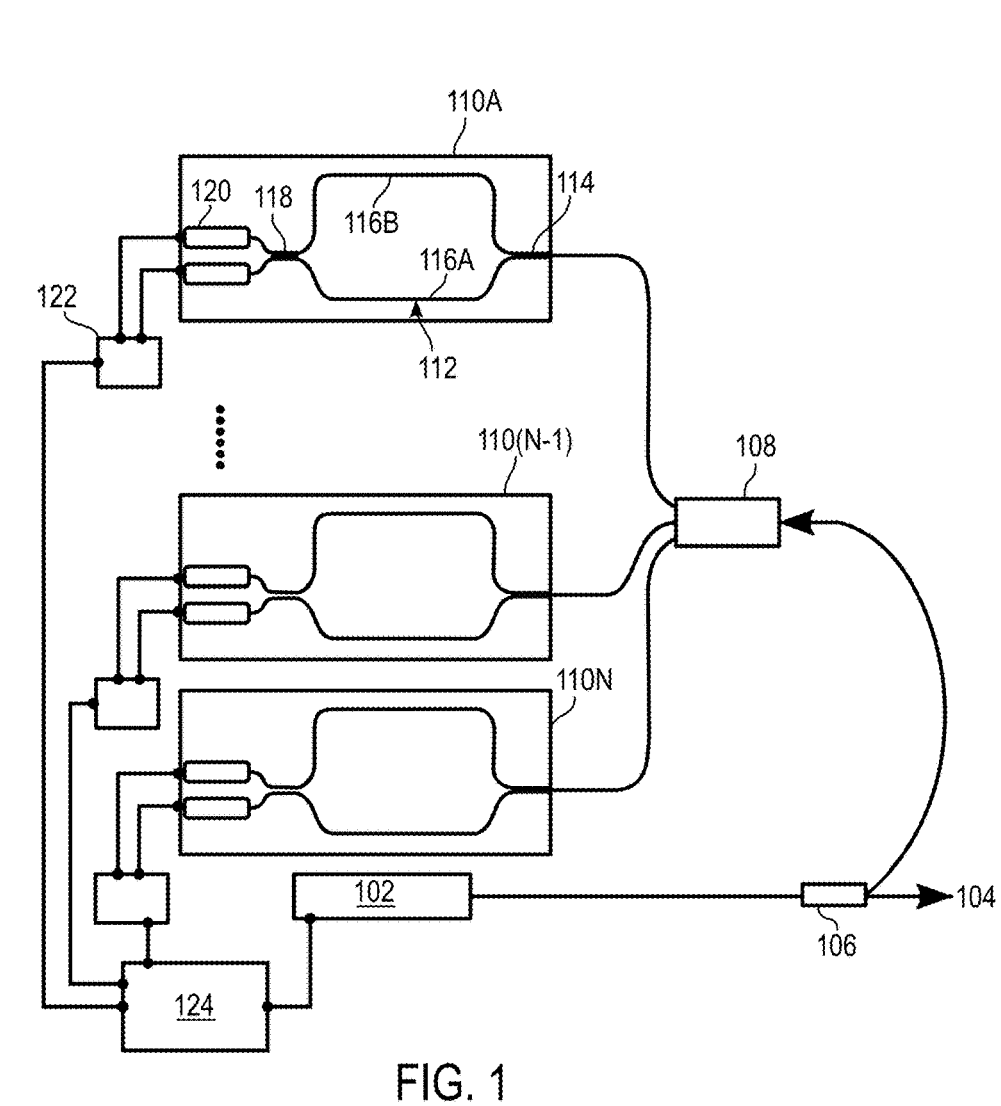
FIG. 1 is a simplified block diagram of an example interferometric wavemeter system according to some embodiments of the present disclosure.

The systems, methods and devices of this disclosure each have several innovative aspects, no single one of which is solely responsible for all of the desirable attributes disclosed herein. Details of one or more implementations of the subject matter described in this specification are set forth in the description below and the accompanying drawings.

For purposes of illustrating low loss splitter-combiners described herein, it might be useful to first understand phenomena that may come into play in some systems where photonic devices may be used. The following foundational information may be viewed as a basis from which the present disclosure may be properly explained. Such information is offered for purposes of explanation only and, accordingly, should not be construed in any way to limit the broad scope of the present disclosure and its potential applications.

Silicon photonics-based sensor systems such as LIDAR are being developed to meet the needs for various sensor capabilities and functionalities in different applications. The choice of wavelength range is often determined by the properties of the materials and components used in the system, as well as the specific needs of the application. For example, visible range (approximately 400 nm to 700 nm) that the human eye can perceive as visible light is applicable to many imaging and display technologies, such as cameras, projectors, and monitors. Near-Infrared (NIR) Range (approximately 700 nm to 2500 nm) is often used in a variety of sensing applications, such as night vision, remote sensing, and medical imaging where non-invasive techniques are preferred. Such NIR range systems are increasingly being used in environments covering wavelengths in the range of 1300 nm to 2500 nm in various fields such as pharmaceuticals, agriculture, food quality assessment, and environmental monitoring.

Currently available sensors typically sense wavelengths in narrow ranges, and thus several such sensors may have to be used in wideband applications to cover the desired range of wavelengths. For example, silicon germanium photodiodes have a wavelength range of approximately 300 nm to 1600 nm; indium gallium arsenide photodiodes have a wavelength range of approximately 800 nm to 1700 nm; avalanche photodiodes (APDs) vary in wavelength range according to their configuration, but are commonly available between 800 nm to 1700 nm; charge-coupled devices and Complementary Metal-Oxide-Semiconductor (CMOS) sensors have varying wavelength ranges, but are commonly manufactured for applications up to 1100 nm; etc. Consequently, other components of the photonics systems to interface with such sensors also operate in narrow wavelength ranges. For example, there are no interferometric wavemeter PIC for broadband sensors/LIDAR/biosensors applications from visible to NIR wavelength ranges (600 nm-2500 nm). Some systems use a single Mach-Zehnder Interferometer (MZI) for coarse grid resolution; however, such systems are for use with narrow band sensors. Besides, a single wavemeter may not address broadband (e.g., visible to NIR) wavelengths due to the lack of resolution across different wavelengths. Additionally, manufacturers are increasingly faced with the challenge to shrink the form factor of sensor systems, so that increasing the number of sensors in a constrained space presents many challenges. Another challenge in such photonics systems is the need to reduce loss and thereby improve sensitivity and resolution of the sensors.

Accordingly, an interferometric wavemeter as described herein may be used in broadband applications across a wide range of wavelengths (e.g., 600 nm to 2500 nm). The interferometric wavemeter includes 1×N branching with multiple unbalanced MZIs with free spectral range (FSR) detuning, or center wavelength Vernier detuning, offering laser wavelength locking, monitoring, and/or detection in a fine-grid resolution, with variable slope detection sensitivity, and hitless detection in broadband wavelength ranges for sensor/LIDAR and biosensor applications. As is known in the art, detuning is the difference between the resonance frequency of the system and the laser's optical frequency. The Vernier effect applied to interferometers is a recent tool in the industry to enhance the sensitivity and resolution of optical fiber sensors. This effect relies on the overlap between the signals of two interferometers with slightly detuned interference frequencies. The Vernier envelope modulation generated at the output spectrum presents magnified sensing capabilities (i.e., magnified wavelength shift) compared to that of individual sensing interferometers.

The various embodiments as described herein may be implemented in a PIC. In some embodiments, the PIC may be fabricated using conventional lithography techniques applicable to silicon-based ICs (e.g., silicon photonics PIC). The PIC may be co-packaged with an EIC in a single microelectronic device in an example embodiment. In other embodiments, the PIC may be a standalone component, optically and electrically coupled to one or more EICs and/or other electronic components in a larger electronic/photonic system.

In some embodiments, an athermal design may be used with silicon photonics PIC based on silicon nitride waveguides, built-in p-i-n silicon thermal diodes for temperature monitoring, and integration of photodetectors on PICs. Alternative thermal waveguides include silicon oxide in SOI (silicon on insulator), silicon oxynitride $SiO_xNy$, and polymers with low thermal-optical coefficient. Some advantages of the embodiments disclosed herein include: availability of fine interferometric wavemeters in silicon photonics PIC for broadband sensor and biophotonics applications; implementation in athermal silicon nitride waveguide platforms for example, for temperature-insensitive and stable performance, higher reliability, lower cost, and ease of manufacturability; implementation in one single integrated silicon photonics chip, compatible with any silicon photonics manufacturing process line (e.g., 300 mm complementary metal oxide semiconductor (CMOS) fabrication technology); and an integrated solution with active photodetectors and other such semiconductor/electronics elements to offer enhanced functionalities for the sensors. In various embodiments, athermal waveguides may minimize thermal drift in the ambient temperature environment, so that the wavemeters may work continuously in hitless monitoring, detecting and locking of the broadband laser source without any additional guard band across the broad wavelength range.

In the following detailed description, various aspects of the illustrative implementations may be described using terms commonly employed by those skilled in the art to convey the substance of their work to others skilled in the art.

The terms "circuit" and "circuitry" mean one or more passive and/or active electrical and/or electronic components and/or photonic components and/or optical components that are arranged to cooperate with one another to provide a desired function. The terms also refer to analog circuitry, digital circuitry, hard wired circuitry, programmable circuitry, microcontroller circuitry and/or any other type of physical hardware electrical and/or electronic component.

The term "integrated circuit" means a circuit that is integrated into a monolithic semiconductor or analogous material.

In some embodiments, the IC dies disclosed herein may comprise substantially monocrystalline semiconductors, such as silicon or germanium, as a base material (e.g., substrate, body) on which integrated circuits are fabricated with traditional semiconductor processing methods. The semiconductor base material may include, for example, N-type or P-type materials. Dies may include, for example, a crystalline base material formed using a bulk silicon (or other bulk semiconductor material) or a silicon-on-insulator (SOI) structure. In some other embodiments, the base material of one or more of the IC dies may comprise alternate materials, which may or may not be combined with silicon that include but are not limited to germanium, indium antimonide, lead telluride, indium arsenide, indium phosphide, gallium arsenide, indium gallium arsenide, gallium antimonide, or other combinations of group III-N, group III-V, group II-VI, or group IV materials. In yet other embodiments, the base material may comprise compound semiconductors, for example, with a first sub-lattice of at least one element from group III of the periodic table (e.g., Al, Ga, In), and a second sub-lattice of at least one element of group V of the periodic table (e.g., P, As, Sb). In yet other embodiments, the base material may comprise an intrinsic IV or III-V semiconductor material or alloy, not intentionally doped with any electrically active impurity; in alternate embodiments, nominal impurity dopant levels may be present. In still other embodiments, dies may comprise a non-crystalline material, such as polymers; for example, the base material may comprise silica-filled epoxy. In other embodiments, the base material may comprise high mobility oxide semiconductor material, such as tin oxide, antimony oxide, indium oxide, indium tin oxide, titanium oxide, zinc oxide, indium zinc oxide, indium gallium zinc oxide (IGZO), gallium oxide, titanium oxynitride, ruthenium oxide, or tungsten oxide. In general, the base material may include one or more of tin oxide, cobalt oxide, copper oxide, antimony oxide, ruthenium oxide, tungsten oxide, zinc oxide, gallium oxide, titanium oxide, indium oxide, titanium oxynitride, indium tin oxide, indium zinc oxide, nickel oxide, niobium oxide, copper peroxide, IGZO, indium tel-luride, molybdenite, molybdenum diselenide, tungsten dis-elenide, tungsten disulfide, N- or P-type amorphous or polycrystalline silicon, germanium, indium gallium arsenide, silicon germanium, gallium nitride, aluminum gallium nitride, indium phosphide, and black phosphorus, each of which may possibly be doped with one or more of gallium, indium, aluminum, fluorine, boron, phosphorus, arsenic, nitrogen, tantalum, tungsten, and magnesium, etc. Although a few examples of the material for dies are described here, any material or structure that may serve as a foundation (e.g., base material) upon which IC circuits and structures as described herein may be built falls within the spirit and scope of the present disclosure.

Unless described otherwise, IC dies described herein include one or more IC structures (or, simply, "ICs") imple-menting (i.e., configured to perform) certain functionality. In one such example, the term "memory die" may be used to describe a die that includes one or more ICs implementing memory circuitry (e.g., ICs implementing one or more of memory devices, memory arrays, control logic configured to control the memory devices and arrays, etc.). In another such example, the term "compute die" may be used to describe a die that includes one or more ICs implementing logic/compute circuitry (e.g., ICs implementing one or more of I/O functions, arithmetic operations, pipelining of data, etc.).

The term "optical structure" includes arrangements of forms fabricated in ICs to receive, transform and/or transmit optical signals as described herein. It may include optical conductors such as waveguides, electromagnetic radiation sources such as lasers and light-emitting diodes (LEDs) and electro-optical devices such as photodetectors.

In various embodiments, any PIC described herein may comprise a semiconductor material including, for example, N-type or P-type materials. The PIC may include, for example, a crystalline base material formed using a bulk silicon (or other bulk semiconductor material) or a SOI structure (or, in general, a semiconductor-on-insulator struc-ture). In some embodiments, the PIC may be formed using alternative materials, which may or may not be combined with silicon, that include, but are not limited to, lithium niobite, indium phosphide, silicon dioxide, germanium, sili-con germanium, indium antimonide, lead telluride, indium arsenide, indium phosphide, gallium arsenide, aluminum gallium arsenide, aluminum arsenide, indium aluminum arsenide, aluminum indium antimonide, indium gallium arsenide, gallium nitride, indium gallium nitride, aluminum indium nitride or gallium antimonide, or other combinations of group III-N or group IV materials. In some embodiments, the PIC may comprise a non-crystalline material, such as polymers. In some embodiments, the PIC may be formed on a printed circuit board (PCB). In some embodiments, the PIC may be inhomogeneous, including a carrier material (such as glass or silicon carbide) as a base material with a thin semiconductor layer over which is an active side comprising transistors and like components. Although a few examples of the material for the PIC are described here, any material or structure that may serve as a foundation upon which the PIC may be built falls within the spirit and scope of the present disclosure.

The term "insulating" means "electrically insulating," the term "conducting" means "electrically conducting," unless otherwise specified. With reference to optical signals and/or devices, components and elements that operate on or using optical signals, the term "conducting" can also mean "opti-cally conducting."

The terms "oxide," "carbide," "nitride," etc. refer to compounds containing, respectively, oxygen, carbon, nitro-gen, etc.

The term "waveguide" refers to any structure that acts to guide the propagation of light from one location to another location typically through a substrate material such as sili-con or glass. In various examples, waveguides may be formed from silicon, doped silicon, silicon nitride, glasses such as silica (e.g., silicon dioxide or $SiO_2$), borosilicate (e.g., 70-80 wt % $SiO_2$, 7-13 wt % of $B_2O_3$, 4-8 wt % $Na_2O$ or $K_2O$, and 2-8 wt % of $Al_2O_3$) and so forth. Waveguides may be formed using various techniques including but not limited to forming waveguides in situ. For example, in some embodiments, waveguides may be formed in situ in glass using low temperature glass-to-glass bonding or by laser direct writing. Waveguides formed in situ may have lower loss characteristics.

The terms "substantially," "close," "approximately," "near," and "about," generally refer to being within +/−20% of a target value (e.g., within +/−5% or 10% of a target value) based on the context of a particular value as described herein or as known in the art.

Terms indicating orientation of various elements, e.g., "coplanar," "perpendicular," "orthogonal," "parallel," or any other angle between the elements, generally refer to being within +/−5%-20% of a target value based on the context of a particular value as described herein or as known in the art.

The term "connected" means a direct connection (which may be one or more of a mechanical, electrical, and/or thermal connection) between the things that are connected, without any intermediary devices, while the term "coupled" means either a direct connection between the things that are connected, or an indirect connection through one or more passive or active intermediary devices.

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous.

The disclosure may use perspective-based descriptions such as "above," "below," "top," "bottom," and "side"; such descriptions are used to facilitate the discussion and are not intended to restrict the application of disclosed embodi-ments. The terms "over," "under," "between," and "on" as used herein refer to a relative position of one material layer or component with respect to other layers or components. For example, one layer disposed over or under another layer may be directly in contact with the other layer or may have one or more intervening layers. Moreover, one layer disposed between two layers may be directly in contact with one or both of the two layers or may have one or more intervening layers. In contrast, a first layer described to be "on" a second layer refers to a layer that is in direct contact with that second layer. Similarly, unless explicitly stated otherwise, one feature disposed between two features may be in direct contact with the adjacent features or may have one or more intervening layers. The term "dispose" as used herein refers to position, location, placement, and/or arrangement rather than to any particular method of formation. The term "between," when used with reference to measurement ranges, is inclusive of the ends of the measurement ranges.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). When used herein, the notation "A/B/C" means (A), (B), and/or (C).

As used herein, the terms "package" and "integrated circuit (IC) package" are synonymous, as are the terms "die" and "IC die." Furthermore, the terms "chip," "chiplet," "die," and "IC die" may be used interchangeably herein. Although certain elements may be referred to in the singular herein, such elements may include multiple sub-elements. For example, "an insulator material" may include one or more insulator materials.

Although certain elements may be referred to in the singular herein, such elements may include multiple sub-elements. For example, "an optically conductive material" may include one or more optically conductive materials. In another example, "a dielectric material" may include one or more dielectric materials.

Unless otherwise specified, the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner. For convenience, the phrase "photodetectors 120" may be used to refer to a collection of photodetectors 120-1, 120-2, and so on. Likewise, the phrase "wavemeters 110" may be used to refer to a collection of wavemeters 110*a*, 110*b*, and so on.

In the following detailed description, reference is made to the accompanying drawings that form a part hereof, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense. The accompanying drawings are not necessarily drawn to scale. In the drawings, same reference numerals refer to the same or analogous elements/materials shown so that, unless stated otherwise, explanations of an element/material with a given reference numeral provided in context of one of the drawings are applicable to other drawings where element/materials with the same reference numerals may be illustrated. Further, the singular and plural forms of the labels may be used with reference numerals to denote a single one and multiple ones respectively of the same or analogous type, species, or class of element.

Furthermore, in the drawings, some schematic illustrations of example structures of various devices and assemblies described herein may be shown with precise right angles and straight lines, but it is to be understood that such schematic illustrations may not reflect real-life process limitations which may cause the features to not look so "ideal" when any of the structures described herein are examined using, e.g., images of suitable characterization tools such as scanning electron microscopy (SEM) images, transmission electron microscope (TEM) images, or non-contact profilometer. In such images of real structures, possible processing and/or surface defects could also be visible, e.g., surface roughness, curvature or profile deviation, pit or scratches, not-perfectly straight edges of materials, tapered vias or other openings, inadvertent rounding of corners or variations in thicknesses of different material layers, occasional screw, edge, or combination dislocations within the crystalline region(s), and/or occasional dislocation defects of single atoms or clusters of atoms. There may be other defects not listed here but that are common within the field of device fabrication and/or packaging.

Note that in the figures, various components (e.g., interconnects) are shown as aligned (e.g., at respective interfaces) merely for ease of illustration; in actuality, some or all of them may be misaligned. In addition, there may be other components, such as bond-pads, landing pads, metallization, etc. present in the assembly that are not shown in the figures to prevent cluttering. Further, the figures are intended to show relative arrangements of the components within their assemblies, and, in general, such assemblies may include other components that are not illustrated (e.g., various interfacial layers or various other components related to optical functionality, electrical connectivity, or thermal mitigation). For example, in some further embodiments, the assembly as shown in the figures may include more dies along with other electrical components. Additionally, although some components of the assemblies are illustrated in the figures as being planar rectangles or formed of rectangular solids, this is simply for ease of illustration, and embodiments of these assemblies may be curved, rounded, or otherwise irregularly shaped as dictated by and sometimes inevitable due to the manufacturing processes used to fabricate various components.

In the drawings, a particular number and arrangement of structures and components are presented for illustrative purposes and any desired number or arrangement of such structures and components may be present in various embodiments.

Further, unless otherwise specified, the structures shown in the figures may take any suitable form or shape according to material properties, fabrication processes, and operating conditions.

Figure 10:
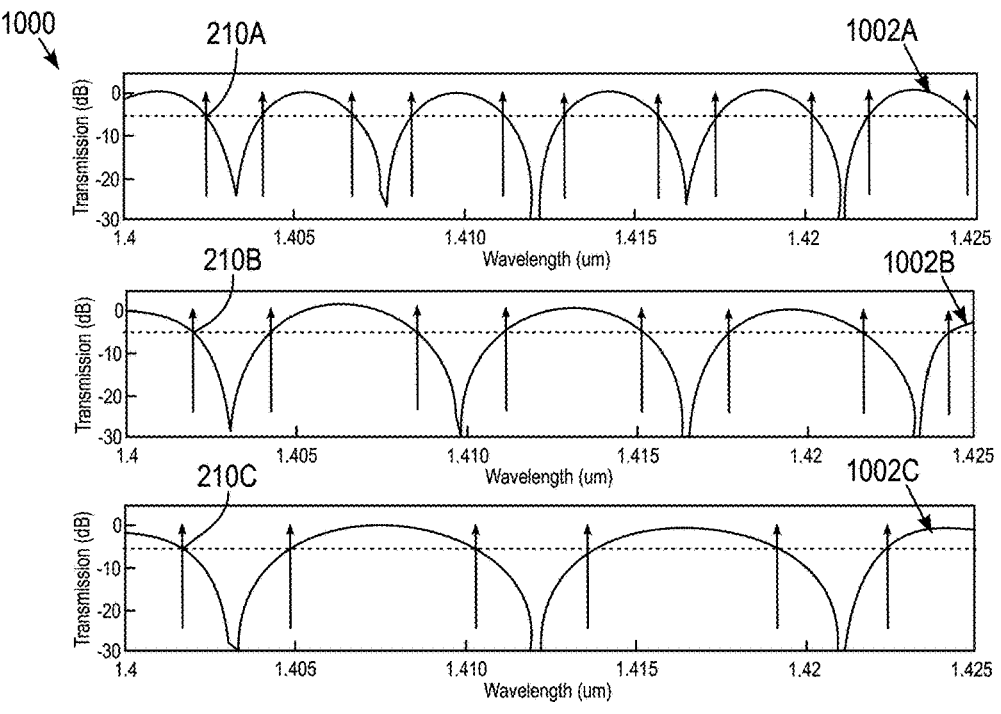
FIG. 10 is a graph of certain simulation results analyzing an example interferometric wavemeter system according to some embodiments of the present disclosure.

For convenience, if a collection of drawings designated with different letters are present (e.g., FIGS. 10A-10C), such a collection may be referred to herein without the letters (e.g., as "FIG. 10"). Similarly, if a collection of reference numerals designated with different letters are present (e.g., 112*a*-112*e*), such a collection may be referred to herein without the letters (e.g., as "112").

Various operations may be described as multiple discrete actions or operations in turn in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

EXAMPLE EMBODIMENTS

FIG. 1 is a simplified block diagram of an example interferometric wavemeter system 100 according to some embodiments of the present disclosure. A broadband laser 102 may generate an optical signal 104 comprising various wavelengths, for example, ranging from 600 nm to 2500 nm. Unlike traditional lasers that emit light at a single, well-defined wavelength, broadband laser 102 may generate a spectrum of wavelengths simultaneously. Any suitable technique (e.g., supercontinuum generation, frequency combing, etc.) for generating optical signals in various wavelengths may be used in broadband laser 102 within the broad scope of the embodiments herein.

A tap 106 in the line of optical signal 104 may siphon a portion thereof to a 1×n splitter 108, from where the tapped portion may be sent to a plurality of wavemeters 110a, 110b . . . 110(n−1), 110n arranged in parallel. Wavemeters 110 are specialized instruments to measure and accurately determine the wavelengths of optical signal 104. Wavemeters 110 may facilitate measuring the wavelengths of broadband laser 102 down to sub-picometer ($10^{-12}$ meters) accuracy in some embodiments. In many embodiments, wavemeters 110 may use light interference to accurately determine the wavelengths. Such types of wavemeters 110 create interference patterns between optical signal 104 being measured and a reference beam.

In various embodiments, each wavemeter 110 may include a suitable MZI 112, comprising a 1×2 splitter 114 (or coupler), reference arm 116a and sensing arm 116b, and a 2×1 combiner 118 (or coupler). In some embodiments, 1×n splitter 108 may comprise a star coupler; in some other embodiments, 1×n splitter 108 may comprise a sequential Y-splitter; in yet other embodiments, 1×n splitter 108 may comprise a multi-mode interference (MMI) coupler with one input and N outputs. Wavemeters 110 including MZIs 112, splitters 114, waveguides 116, and combiners 118, and 1×n splitter 108 may comprise any suitable material such as silicon, silicon nitride, silicon-on-insulator, or other suitable material in any suitable cladding. In embodiments where the material is silicon nitride ($Si_3N_4$), the wavelength range within which the system can operate may range from 700 nm to 2500 nm.

Each MZI 112 in an individual wavemeter 110 comprises 1×2 splitter 114 that bifurcates incoming optical signal 104 into reference arm 116a and sensing arm 116b, such that the light in each arm travels a potentially different length due to the different arm lengths or respective refractive indices. This splitting of optical signal 104 into reference arm 116a and sensing arm 116b enables optical spectral transmission interference that may be used to determine the wavelengths of incoming optical signal 104 accurately. The signals are recombined in combiner 118, generating optical intensity maxima or minima interference patterns, and sent to one or more photodetectors 120. Examples of photodetectors 120 include photodiodes, avalanche photodiodes, phototransistors, PIN diodes, CMOS image sensors, photomultiplier tubes, and quantum photodetectors.

The output from photodetectors 120 may be sent to a wavelength control loop 122 that analyzes the output, determines whether any modification (e.g., tuning) in broadband laser 102 is necessary and provides appropriate feedback signals. A control circuit 124 may be coupled to wavelength control loop 122 of each wavemeter 110, control circuit 124 operating to monitor, detect, control, and modulate broadband laser 102 according to the detected outputs from each wavemeter 110. Wavelength control loop 122 and control circuit 124 may together comprise various components, including actuators that physically adjust broadband laser 102, electronic circuitry for signal processing, memory storing control algorithms, processing devices to execute the various algorithms, controllers, etc. In various embodiments, due to the use of the Vernier effect, the greater the number of wavemeters 110 used, the wider the wavelength range of measurement, and higher the resulting sensitivity (and/or resolution) of interferometric wavemeter system 100 as a whole.

Figure 2:
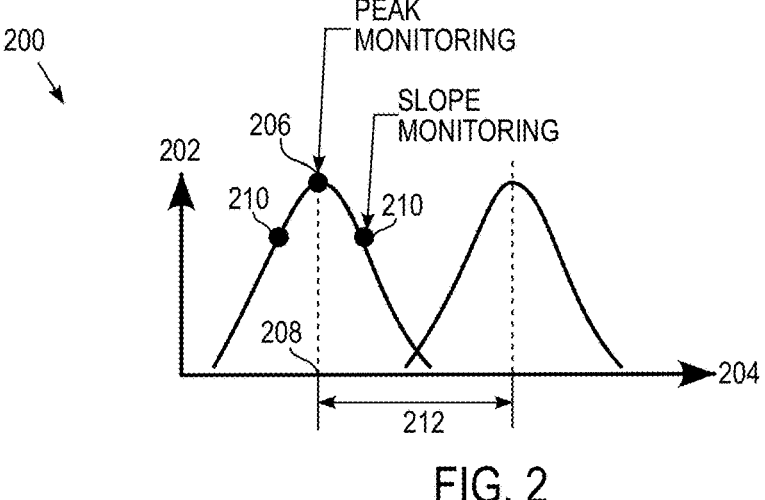
FIG. 2 is a simplified diagram of some outputs from the example interferometric wavemeter system of FIG. 1 according to some embodiments of the present disclosure.

FIG. 2 is a simplified diagram of some outputs 200 from the example interferometric wavemeter system 100 according to some embodiments of the present disclosure. The figure shows intensity 202 of optical signal 104 detected by a single photodetector 120 in any one wavemeter 110 plotted against wavelengths 204 of optical signal 104. In some embodiments, wavelength control loop 122 coupled to wavemeter 110 may monitor a peak intensity 206 to determine a center wavelength 208 of optical signal 104. In some other embodiments, wavelength control loop 122 may monitor a power slope 210 as a ratio of change in intensity 202 with wavelength 204 at approximately 3 dB below peak intensity 206, or the quadrature point in the middle between the maximum and minimum intensity 202. Wavelength control loop 122 may also calculate an FSR 212 from the output at photodetector 120. FSR 212 represents the separation between consecutive interference fringes in the output of MZI 112; in other words, it is the spacing in optical wavelength between two successive reflected or transmitted optical intensity maxima of optical signal 104. In some embodiments, the Vernier effect is used to obtain FSR detuning, according to which, the larger the arm length difference ΔL between reference arm 116a and sensing arm 116b of MZI 112, the higher the sensitivity amplification that may be achieved. In some other embodiments, the Vernier effect in offset center wavelengths 208 may be used for high resolution detection.

FSR 212 in terms of optical frequency of any one wavemeter 110 is calculated as follows:

$$FSR(f) = \frac{c}{2 \cdot N_g \Delta L}$$

where c is the speed of light in vacuum (approximately $3\times10^8$ m/s), and ΔL is the arm length difference between reference arm 116a and sensing arm 116b of MZI 112. $N_g$ is the group index of reference arm 116a and sensing arm 116b. FSR 212 in terms of optical wavelength may alternatively be computed as:

$$FSR(\lambda) = \frac{\lambda_0^2}{N_g \cdot \Delta L}$$

where $\lambda_0$ is center wavelength 208 of MZI 112, $N_g$ is the group index and ΔL is the arm length difference between reference arm 116a and sensing arm 116b of MZI 112. A larger ΔL leads to a smaller value of FSR 212, and correspondingly greater accuracy for wavemeter 110; however, larger ΔLs necessitate longer wavemeters 110 whereas space limitations of interferometric wavemeter system 100 in its end-use application may constrain the length of wavemeters 110.

Figure 3:
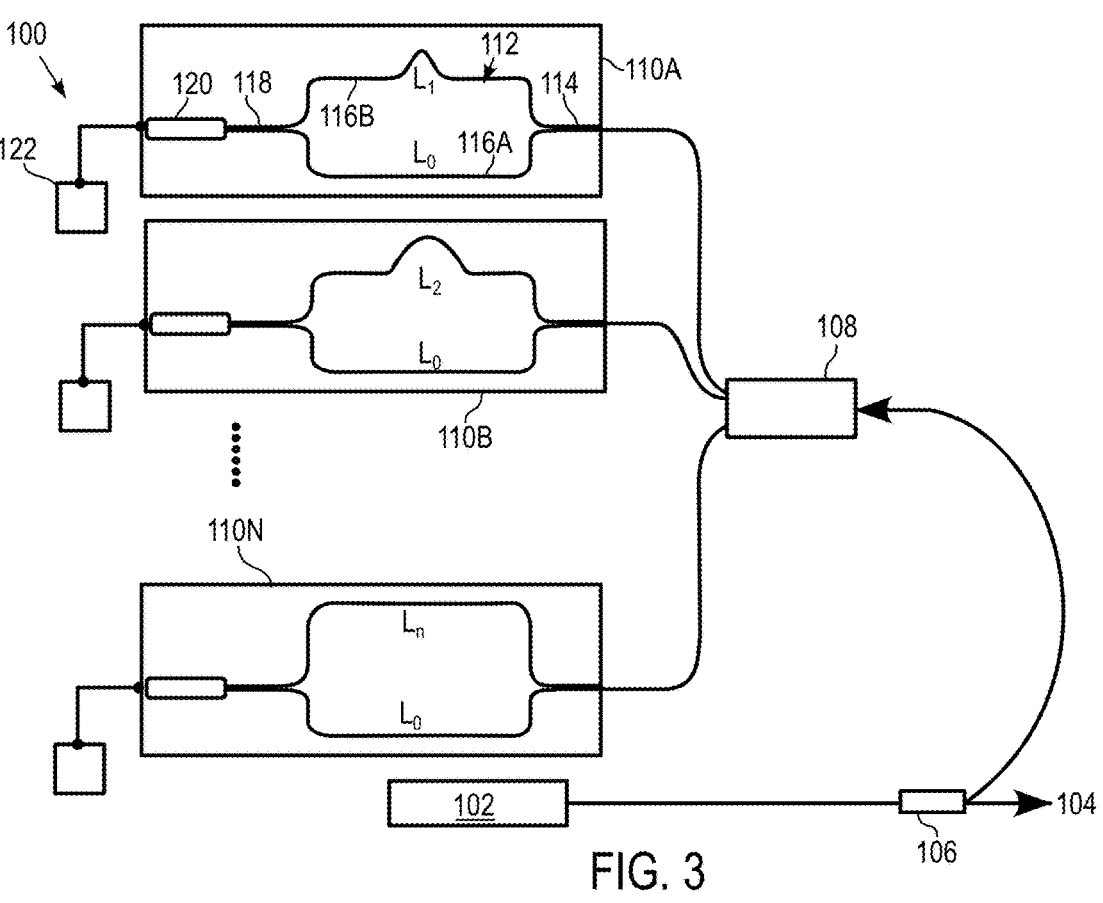
FIG. 3 is a simplified block diagram of an example configuration of an interferometric wavemeter system according to some embodiments of the present disclosure.

FIG. 3 is a simplified block diagram of an example configuration of interferometric wavemeter system 100 according to some embodiments of the present disclosure. Note that control circuit 124 is not shown merely for ease of illustration and not as a limitation. Interferometric wavemeter system 100 may include any suitable number N of wavemeters 110 as desired based on particular needs. Each wavemeter 110 may include a single photodetector 120. Each wavemeter 110 may also include a slightly different MZI 112 relative to the other wavemeters 110, MZIs 112 varying according to the length of one of two arms (i.e., optical path length), one being sensing arm 116b and the other being reference arm 116a. For example, reference arm 116a may have a length $L_0$ in substantially all wavemeters 110. The length of sensing arm 116b may vary among wavemeters 110, being $L_1$ in wavemeter 110a, $L_2$ in wavemeter 110b, and so on with $L_n$ in wavemeter 110n. Thus, the arm length difference $\Delta L = L - L_0$ where L is the length of sensing arm 116b may vary among wavemeters 110; in other words, FSR 212 may be detuned among wavemeters 110.

In various embodiments, the arm length difference $\Delta L$ may be configured based on a desired FSR-detuning such that each wavemeter 110 may detect a different center wavelength 208 with corresponding FSR 212 being offset by an integer fraction 1/n, where the number N of wavemeters 110 is greater than or equal to n. Assume, merely for the sake of explanation and not as a limitation, that that $L_2 = L_1 + \Delta L$ and $L_n = L_1 - \Delta L$. FSR 212b of wavemeter 110b is configured to be proportionally different from FSR 112a of wavemeter 110a by a fractional amount n, were n is any integer less than or equal to N. Thus, $FSR_2 = FSR_1 - (1/n) * FSR_1$ where $FSR_2$ is FSR 212b of wavemeter 110b, $FSR_1$ is FSR 212a of wavemeter 110a; FSR 212n of wavemeter 110n may be $FSR_n = FSR_1 + (1/n) * FSR_1$. In other words, FSR 212i of any wavemeter 110i differs from FSR 212a of wavemeter 110a by an integer fraction (e.g., m/n) of FSR 212a (e.g., $FSR_2 = FSR_1 + (\frac{1}{5}) * FSR_1$; $FSR_3 = FSR_1 + (\frac{2}{5}) * FSR_1$; $FSR_4 = FSR_1 + (\frac{3}{5}) * FSR_1$; etc.)

Figure 4:
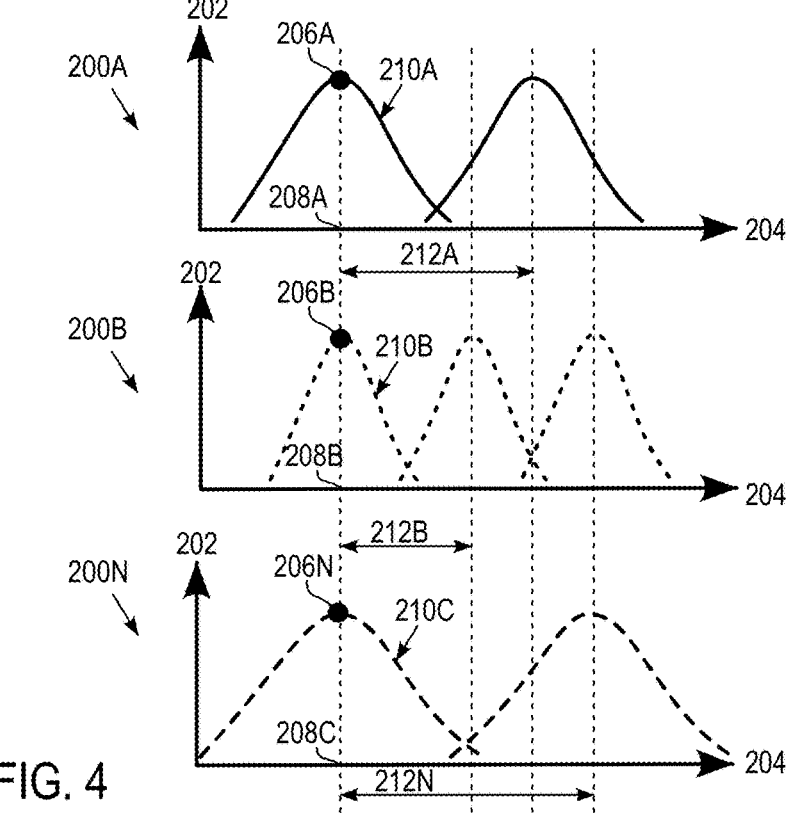
FIG. 4 is a simplified diagram of some outputs from the example interferometric wavemeter system of FIG. 3 according to some embodiments of the present disclosure.

FIG. 4 is a simplified diagram of some outputs 200a . . . 200n from example interferometric wavemeter system 100 of FIG. 3 according to some embodiments of the present disclosure. Output 200a from wavemeter 110a is shown as a continuous line; output 200b from wavemeter 110b is shown as a dotted line; and output 200c from wavemeter 110n is shown as a dashed line. Due to the different arm lengths in each MZI 112a . . . 112n in wavemeters 110a . . . 110n, detected FSRs 212a . . . 212n may be different in each wavemeter 110a . . . 110n as indicated, and center wavelengths 208a . . . 208n corresponding to peak intensities 206a . . . 206n respectively may also be different overall, although one (or more) peaks across the spectrum may coincide. Different FSRs 212 result in different power slopes 210 (i.e., change in intensity with wavelength), resulting in different sensitivities of detection and/or monitoring of wavemeters 110. As mentioned previously, higher is power slope 210, greater is the sensitivity of detection and/or monitoring of corresponding wavemeter 110. For example, power slope 210b is greater than power slopes 210a and 210c). Thus, different wavemeters 110 in this configuration produce different FSRs 212, leading to a broader range of wavemeter resolution than is possible with a single wavemeter 110.

Figure 5:
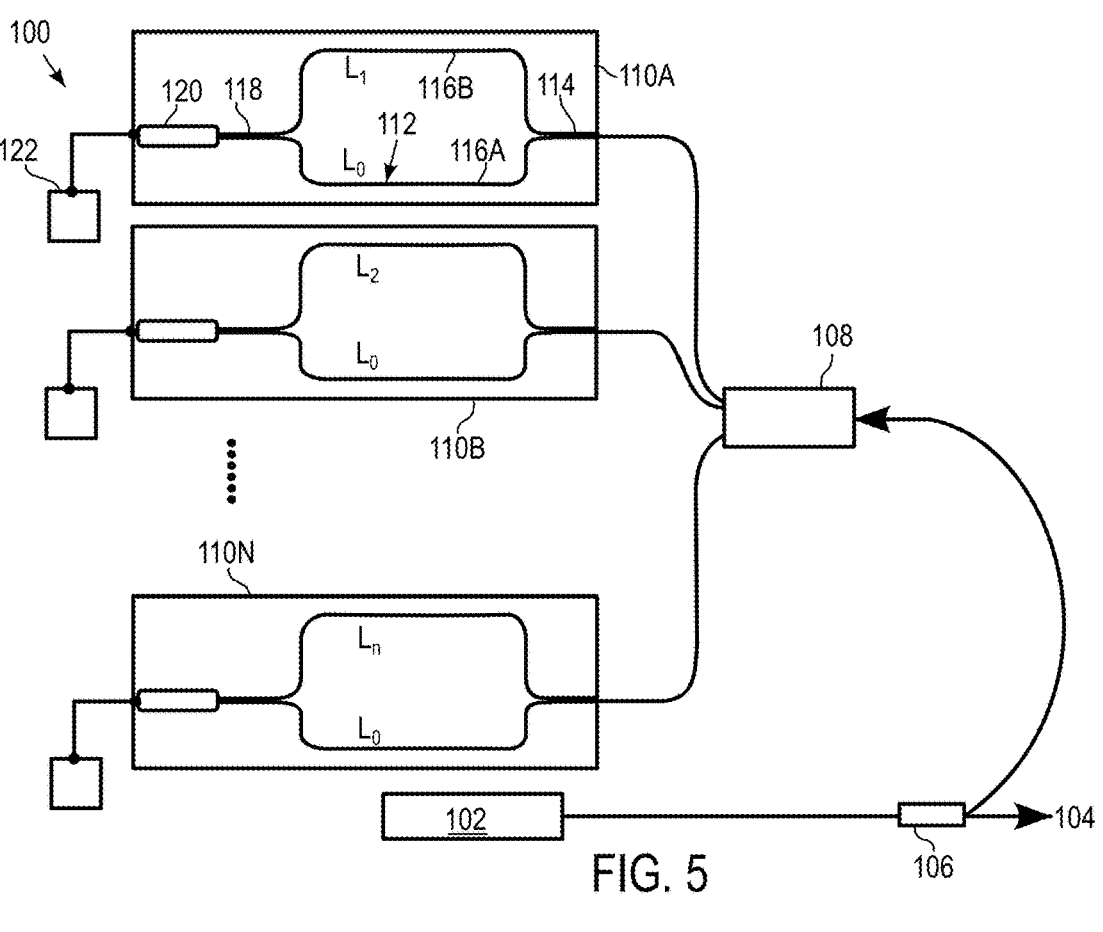
FIG. 5 is a simplified block diagram of another example configuration of an interferometric wavemeter system according to some embodiments of the present disclosure.

FIG. 5 is a simplified block diagram of another example configuration of interferometric wavemeter system 100 according to some embodiments of the present disclosure. Note that control circuit 124 is not shown merely for ease of illustration and not as a limitation. According to some embodiments, the lengths of sensing arm 116b (as also reference arm 116a) in respective MZIs 112a . . . 112n of wavemeters 110a . . . 110n may be similar to each other, resulting in a path length difference $\Delta L$ that is similar between various wavemeters 110a . . . 110n. In other words, $L_1, L_2, \ldots L_n$ of wavemeter 110a, wavemeter 110b, . . . wavemeter 110n are approximately similar (or have only small variations among them, for example, due to introducing small offsets to either the length difference or to differences in respective refractive indices) and $\Delta L$ may be approximately similar for different wavemeters 110a . . . 110n. This may permit center wavelength detuning by a differential amount. In some embodiments, for center wavelength 208 of $\lambda_0$, the detuning may be proportional to the difference in wavelengths between any two wavemeters $\Delta \lambda$ by an integer fraction 1/n, where the number N of wavemeters 110 is greater than or equal to n and $\Delta \lambda$ is the difference in center wavelengths 208 corresponding to two different wavemeters 110. In other words, center wavelength 208i of any wavemeter 110i differs from center wavelength 208a of wavemeter 110a by an integer fraction (e.g., m/n) of the difference between center wavelengths 208a and 208b of wavemeters 110a and 110b (e.g., $\lambda_{03} = \lambda_{01} + (\frac{1}{5}) * (\lambda_{01} - \lambda_{02})$; $\lambda_{04} = \lambda_{01} + (\frac{2}{5}) * (\lambda_{01} - \lambda_{02})$; $\lambda_{05} = \lambda_{01} + (\frac{3}{5}) * (\lambda_{01} - \lambda_{02})$; etc.) In such embodiments, FSR 212 may be approximately same among different wavemeters 110. In various embodiments, each wavemeter 110 may operate at a different value of center wavelength 208; in other words, center wavelength 208 may be detuned among wavemeters 110. As such, the configuration as presented in FIG. 5 may be used in different end-use scenarios than the configuration presented in FIG. 3.

Figure 6:
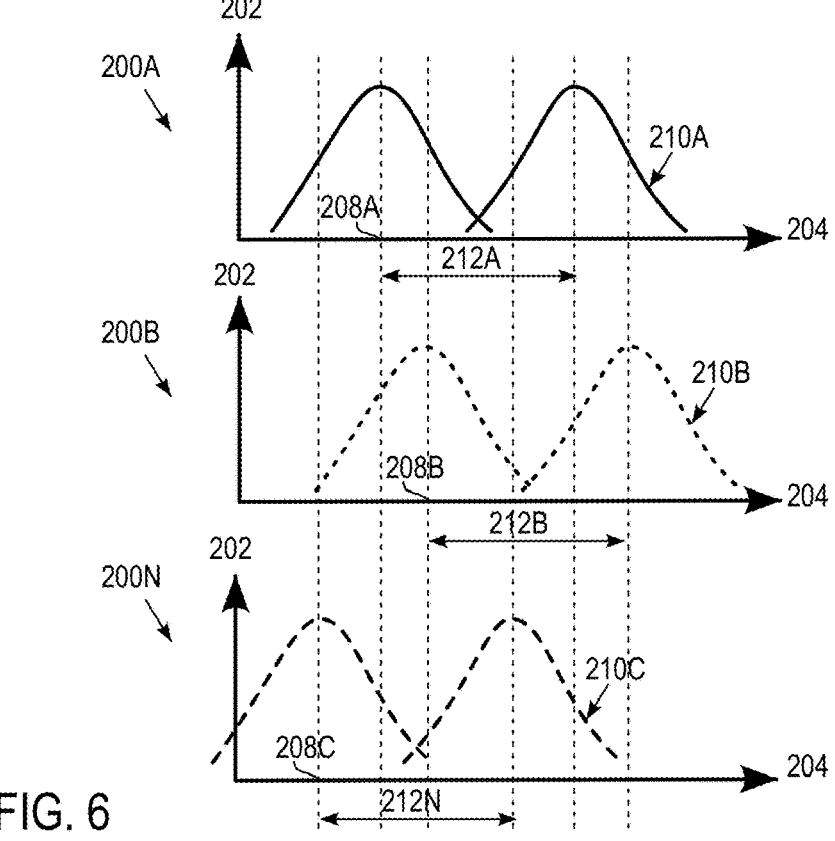
FIG. 6 is a simplified diagram of some outputs from the example interferometric wavemeter system of FIG. 5 according to some embodiments of the present disclosure.

FIG. 6 is a simplified diagram of some outputs 200 from example interferometric wavemeter system 100 of FIG. 5 according to some embodiments of the present disclosure. FSR 212a, 212b, . . . 212n corresponding to wavemeter 110a, wavemeter 110b, . . . wavemeter 110n may all be the same (or substantially similar) due to the similar path length difference $\Delta L$ of MZIs 112 in different wavemeters 110. In such embodiments, center wavelength 208 may be detuned by $\Delta \lambda / n$ or $FSR(\lambda)/n$, where $\Delta \lambda$ is the FSR in optical wavelength space. In such embodiments, detecting variation in power slope 210 across different wavemeters 110 does not provide any information as with the configuration of FIG. 3; on the other hand, detuning center wavelengths 208 is easier for implementation.

Figure 7:
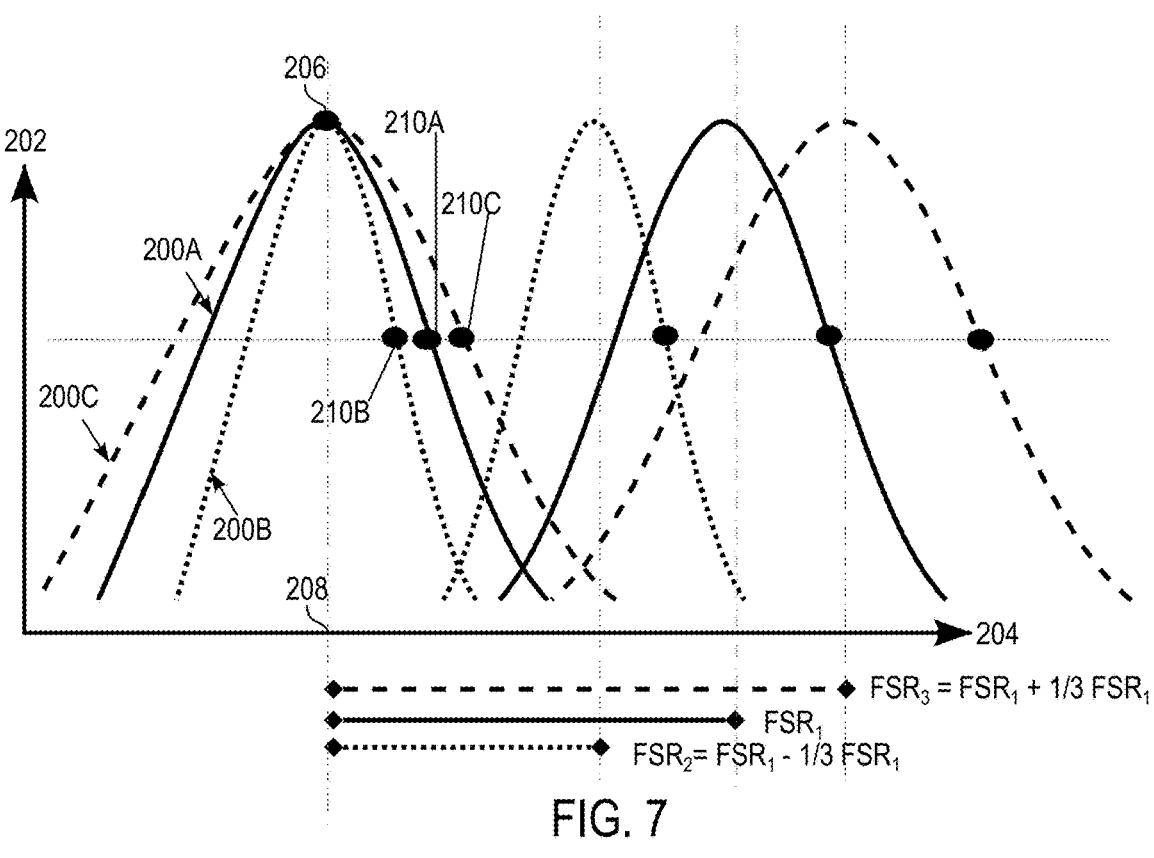
FIG. 7 is a simplified diagram of some outputs from the example interferometric wavemeter system of FIG. 3 according to some embodiments of the present disclosure.

FIG. 7 is a simplified diagram of outputs 200 from example interferometric wavemeter system 100 of FIG. 3 according to some embodiments of the present disclosure. FSR 212 of each wavemeter 110 may be offset by (1/n) in various embodiments. In the example shown, n=3, and the number of wavemeters 110 may also be 3, although such is not necessary for suitable operation of interferometric wavemeter system 100. Outputs 200 from three wavemeters 110a, 110b and 110c are overlaid on each other in the figure so that at least one peak 206 of center wavelength 208 ($\lambda_0$) matches. Further, three different delta power slopes 210a, 210b, and 210c (change in power intensity with wavelength) may be locked, detected and/or monitored at each of three wavemeters 110a, 110b, and 110c. Power slope 210 may reference the detection accuracy of corresponding wavemeter 110: the higher is power slope 210 (e.g., steeper the curve), greater is the detection accuracy. In other words, the smaller is FSR 212 (and higher power slope 210), greater is the detection accuracy when measuring power slope 210.

Figure 8:
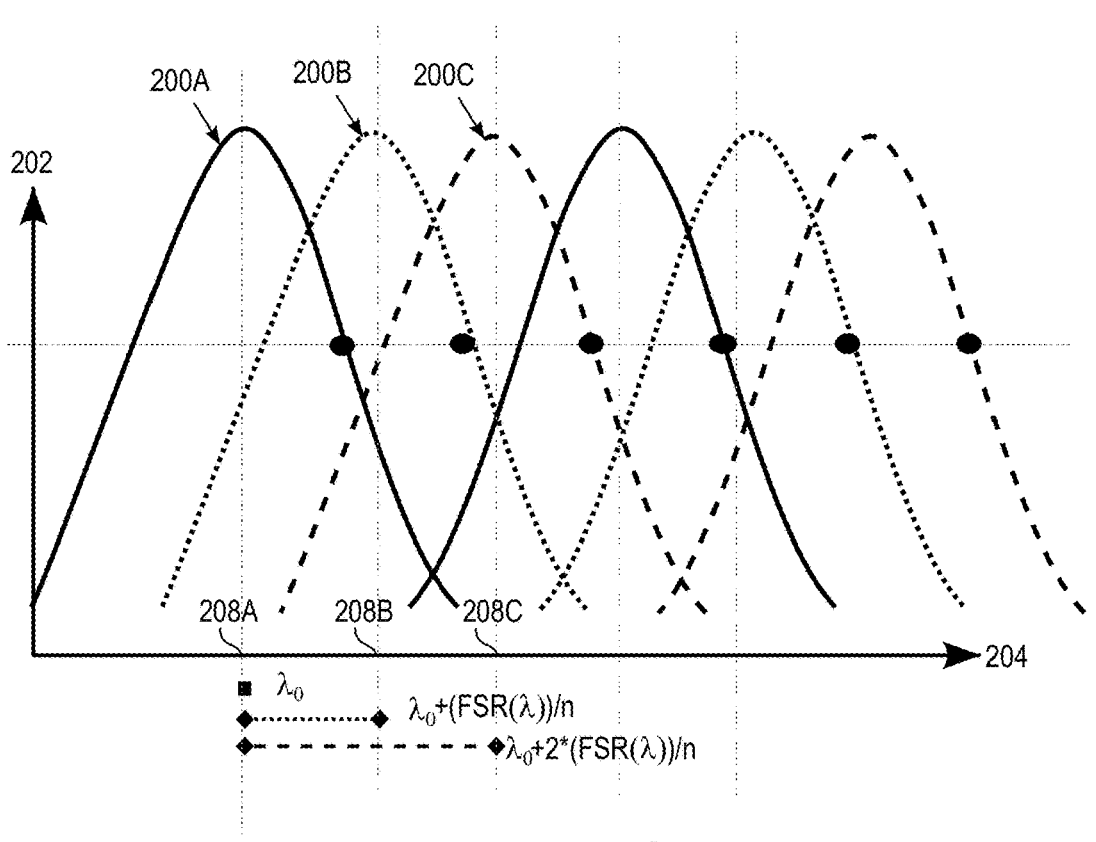
FIG. 8 is a simplified diagram of some outputs from the example interferometric wavemeter system of FIG. 5 according to some embodiments of the present disclosure.

FIG. 8 is a simplified diagram of some outputs 200 from example interferometric wavemeter system 100 of FIG. 5 according to some embodiments of the present disclosure. Center wavelengths 208a, 208b and 208c are functions of the arm length difference ΔL in corresponding wavemeters 110a, 110b and 110c; detuning center wavelength 208 (i.e., varying it slightly) may be by slightly changing the relative length of the arms, namely length of sensing arm 116b relative to reference arm 116a, in each wavemeter 110. In other words, center wavelength 208 may be detuned among different wavemeters 110 by Δλ/n or FSR(λ)/n.

Figure 9:
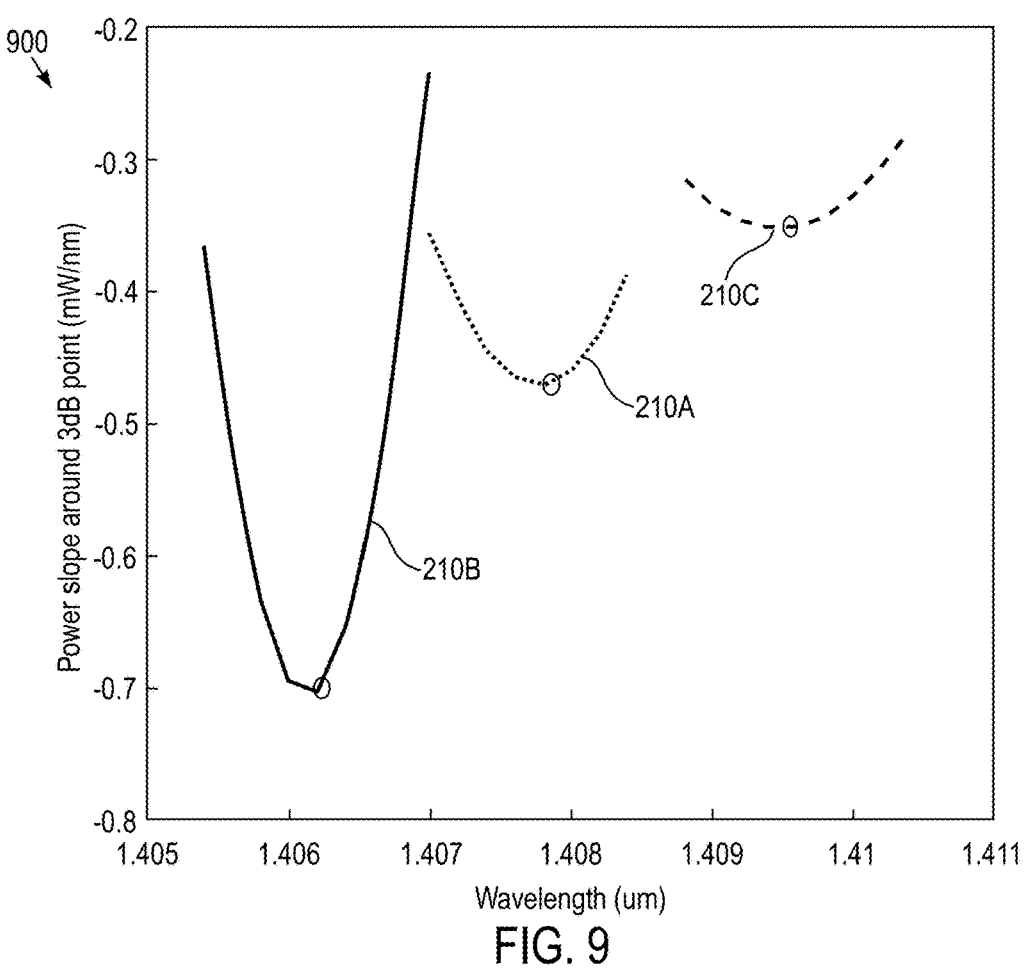
FIG. 9 is a graph of certain simulation results analyzing an example interferometric wavemeter system according to some embodiments of the present disclosure.

FIG. 9 is a graph of certain simulation results 900 analyzing example interferometric wavemeter system 100 according to some embodiments of the present disclosure. The graph shows normalized linear power slope 210 (change in power intensity with wavelength) around the 3 dB point from the peak along the Y-axis and wavelength along the X-axis for outputs from three different wavemeters 110a, 110b and 110c of example interferometric wavemeter system 100 of FIG. 3. Power slope 210b of wavemeter 110b is shown in a continuous line, power slope 210a of wavemeter 110a is shown in a dotted line, and power slope 210c of wavemeter 110c is shown in a dashed line. The circle represents the 3 dB set point, i.e., the quadrature point. Wavemeter 110a offers the most sensitive monitoring according to the simulation results. The slope monitoring at 3 dB point, as shown by the circles on each curve, indicates the maximum detection sensitivity in each wavemeter 110.

FIG. 10 is a graph of certain simulation results 1000 analyzing example interferometric wavemeter system 100 in the configuration of FIG. 3 according to some embodiments of the present disclosure. The graph shows the simulated spectra 1002a, 1002b and 1002c for ideal design with a 25 nm wavelength window around center wavelength 208 of 1400 nm for three wavemeters 110a, 110b and 110c having FSRs 212a, 212b, and 212c of 333.33 Hz (corresponding to spectra 1002a), 500 Hz (corresponding to spectra 1002b) and 666.67 Hz (corresponding to spectra 1002c), respectively. Operation at different temperature deltas 0 C, 5 C, 10 C and 20 C were simulated to study the temperature sensing behavior and the results at 20 C are as shown. In embodiments comprising athermal waveguide material on silicon nitride, the low thermal-optical coefficient is typically low at 10-5/0 C, so the spectral response curves at different temperature deltas of 0 C, 5 C, 10 C and 20 C are nearly not significantly different from each other. Power slope 210 at the 3 dB point on either side of the peak was detected as indicated by the dotted line at 3 dB transmission and the arrows showing the detection points. At FSR 212a of 333.33 Hz, there are many detections at the 3 dB point, whereas the number of detections is lower at higher FSR's, for example at FSR 212c of 666.67 Hz. Higher FSRs 212 may be less sensitive to fabrication variation and allows repeatable good performance at long wavelengths to support broadband sensor needs. Note that FIG. 10 shows an example wavelength of 1400 nm; similar results may be attained for other wavelengths in the NIR range, e.g., 1300 nm or 800 nm.

Figure 11:
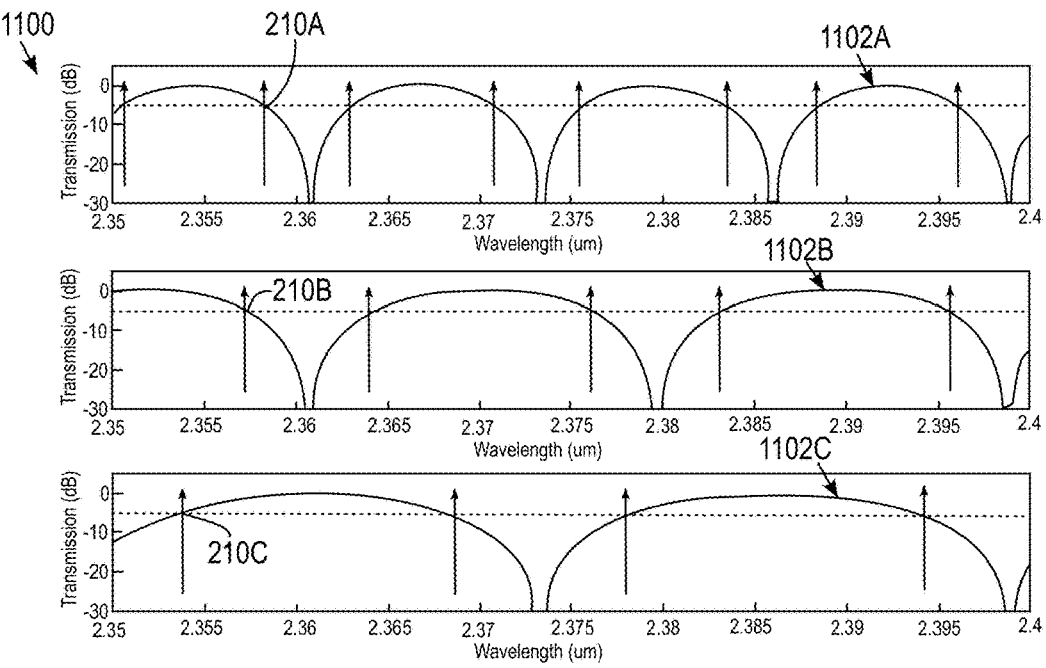
FIG. 11 is a graph of certain simulation results analyzing an example interferometric wavemeter system according to some embodiments of the present disclosure.

FIG. 11 is a graph of certain simulation results 1100 analyzing example interferometric wavemeter system 100 in the configuration of FIG. 3 according to some embodiments of the present disclosure. The graph shows simulated spectra 1102a, 1102b and 1102c for ideal design with a 50 nm wavelength window around center wavelength 208 of 2400 nm for three wavemeters 110a, 110b and 110c having FSRs 212a, 212b, and 212c of 333.33 Hz (corresponding to spectra 1102a), 500 Hz (corresponding to spectra 1102b) and 666.67 Hz (corresponding to spectra 1002c), respectively. Operation at different temperatures 0 C, 5 C, 10 C and 20 C were simulated to study the temperature sensing behavior and the results at 20 C are as shown. Power slope 210 at the 3 dB point on either side of the peak was detected as indicated by the dotted line at 3 dB transmission and the arrows showing the detection points. At FSR 212a of 333.33 Hz, there are many detections at the 3 dB point (but lower than with center wavelength of 1400 nm), whereas the number of detections is lower at higher FSR's. for example, FSR 212c of 666.67 Hz. The combination of different wavemeters 110 having different FSRs 212 and sensitivities across a wide range of wavelengths can allow for use in a wide variety of broadband applications. Note that FIG. 11 shows an example wavelength of 2400 nm; similar results may be attained for other wavelengths in the NIR range, e.g., 2500 nm.

Figure 12:
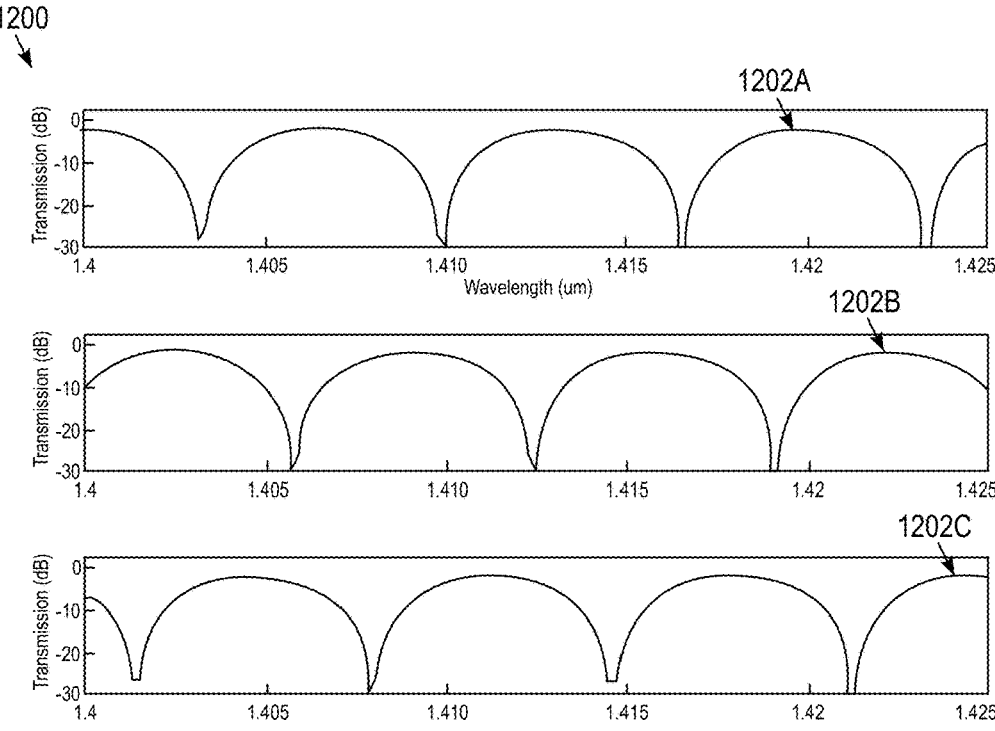
FIG. 12 is a graph of certain simulation results analyzing an example interferometric wavemeter system according to some embodiments of the present disclosure.

FIG. 12 is a graph of certain simulation results 1200 analyzing example interferometric wavemeter system 100 in the configuration of FIG. 5 according to some embodiments of the present disclosure. The graph shows the simulated spectra 1202a, 1202b and 1202c for ideal design with FSR 212 of 500 GHz at three different center wavelengths 208a, 208b and 208c of 1.4 μm (corresponding to spectra 1202a), 1.4022 μm (corresponding to spectra 1202b) and 1.4044 μm (corresponding to spectra 1202c) respectively with a 25 nm wavelength window. Operation at different temperatures 0 C, 5 C, 10 C and 20 C were simulated to study the temperature sensing behavior and the results at 20 C are as shown. Note that FIG. 12 shows an example wavelength of 1400 nm; similar results may be attained for other wavelengths in the NIR range, e.g., 1300 nm or 800 nm.

Figure 13:
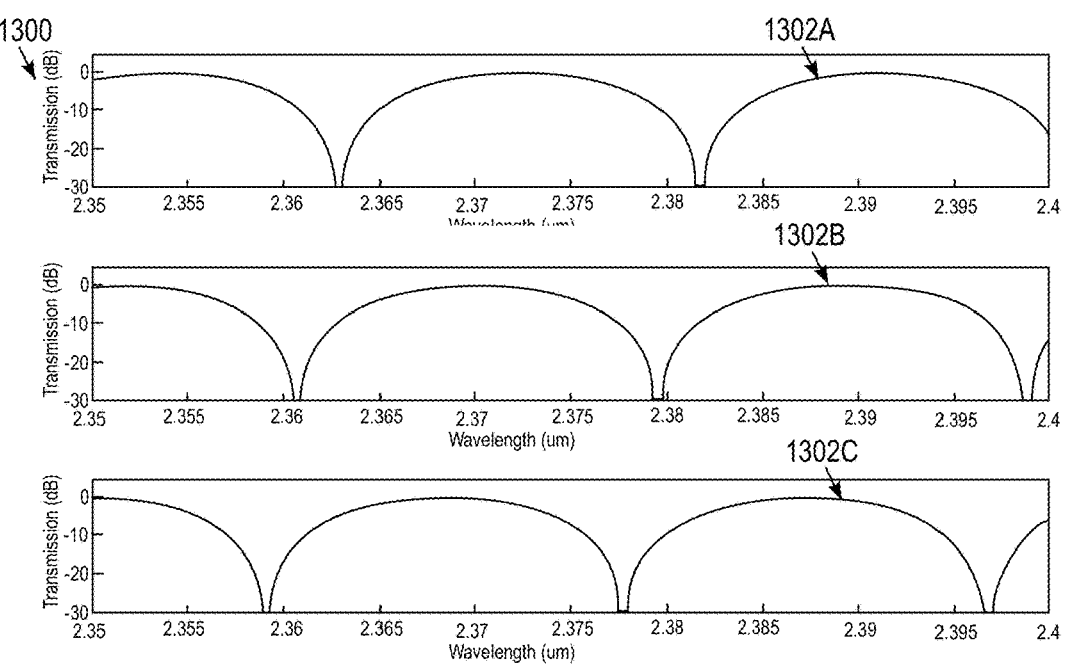
FIG. 13 is a graph of certain simulation results analyzing an example interferometric wavemeter system according to some embodiments of the present disclosure.

FIG. 13 is a graph of certain simulation results 1300 analyzing example interferometric wavemeter system 100 in the configuration of FIG. 5 according to some embodiments of the present disclosure. The graph shows the simulated spectra 1302a, 1302b, and 1302c for ideal design with FSR 212 of 500 GHz at three different center wavelengths 208a, 208b, and 208c, with a 50 nm window. The graph shows a different range of operation compared to FIG. 12, namely a wavelength range between 2.35 μm and 2.4 μm. Operation at different temperatures 0 C, 5 C, 10 C and 20 C were simulated to study the temperature sensing behavior and the results at 20 C are as shown. Note that FIG. 13 shows an example wavelength of 2400 nm; similar results may be attained for other wavelengths in the NIR range, e.g., 2500 nm.

Figure 14:
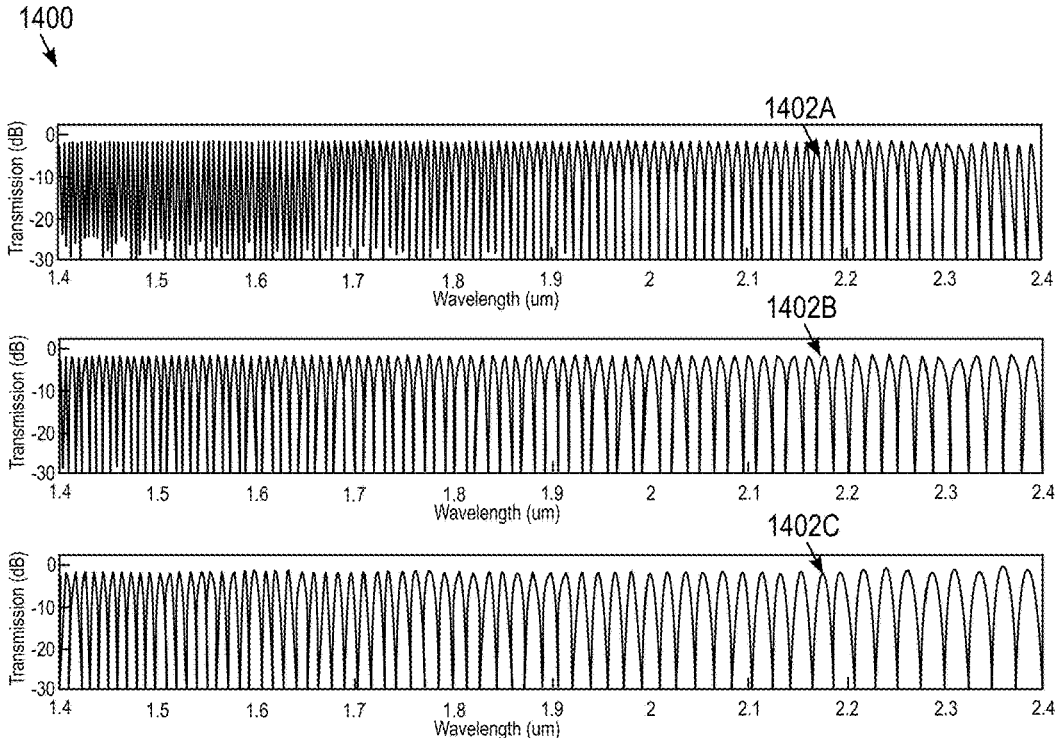
FIG. 14 is a graph of certain simulation results analyzing an example interferometric wavemeter system according to some embodiments of the present disclosure.

FIG. 14 is a graph of certain simulation results 1400 analyzing example interferometric wavemeter system 100 in the configuration of FIG. 3 according to some embodiments of the present disclosure. The graph shows the simulated spectra 1402a, 1402b and 1402c for ideal design with a wavelength range between 1.4 μm and 2.4 μm for three wavemeters 110a, 110b and 110c having FSRs 212a, 212b and 212c of 333.33 GHz (corresponding to spectra 1402a), 500 GHz (corresponding to spectra 1402b) and 666.67 GHz (corresponding to spectra 1402c), respectively. As wavelength 204 increases, power slopes 210 change, affecting the resolution of wavemeters 110a, 110b and 110c accordingly. With larger wavelengths, power slopes 210 are shallower, leading to lower resolution. Different wavemeters 110 may be chosen accordingly for various applications based on the desired sensitivity at different wavelengths. Note that FIG. 14 shows an example wavelength window of 1400 nm-2400 nm; similar results may be attained for other wavelength windows in the NIR range, e.g., 800 nm to 2500 nm.

Figure 15:
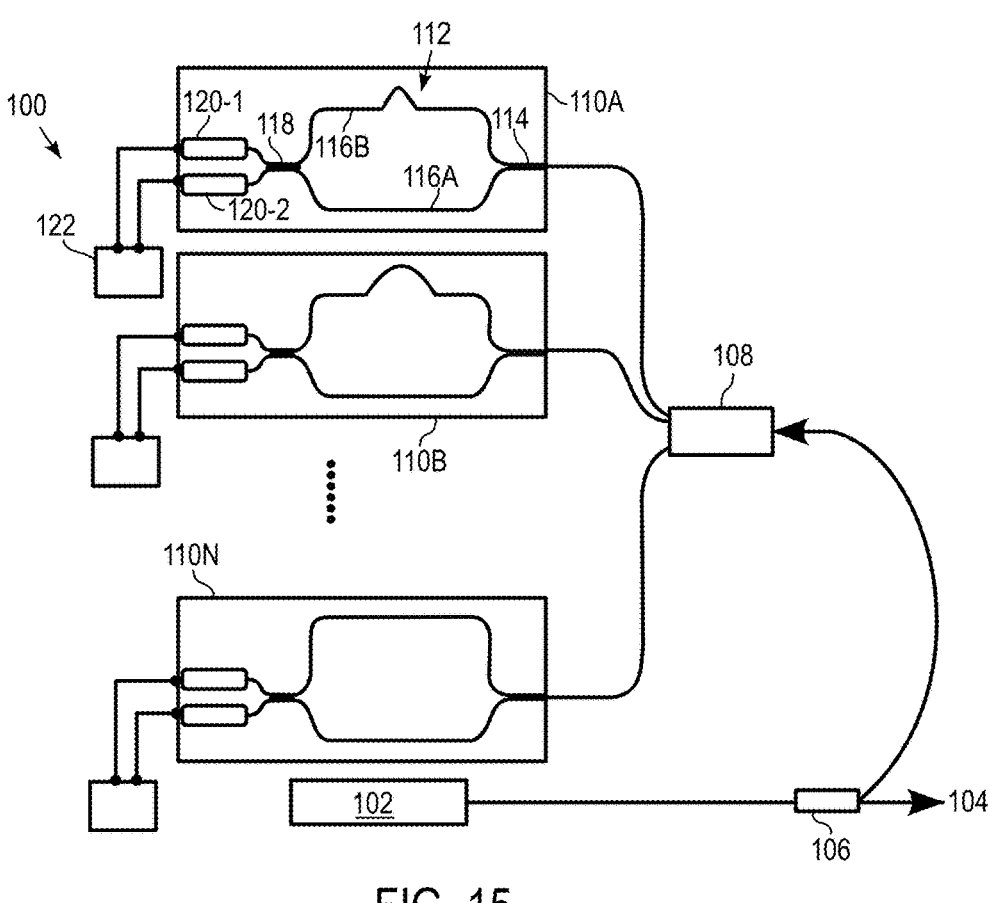
FIG. 15 is a simplified block diagram of yet another example configuration of an interferometric wavemeter system according to some embodiments of the present disclosure.

FIG. 15 is a simplified block diagram of yet another example configuration of interferometric wavemeter system 100 according to some embodiments of the present disclosure. Note that control circuit 124 is not shown merely for ease of illustration and not as a limitation. The embodiment shown is substantially similar to that shown in FIG. 3, except that two photodetectors 120-1 and 120-2 are used instead of one photodetector 120 in each wavemeter 110. Accordingly, the outputs from each wavemeter 110 reflects at least one common center wavelength 208 and different FSRs 212, with the output power from photodetectors 120-1 and 120-2 intercepting approximately at the 3 dB point for more accurate calculation of power slope 210 than with the embodiment of FIG. 3. The higher accuracy comes at the higher cost of the second photodetector.

During operation, the wavemeter monitoring may be set to around 3 dB quadrature point where the intensities detected at photodetectors 120-1 and 120-2 match:

$$\frac{I_{PD1}}{I_{PD2}} \sim 1$$

where $I_{PD1}$ is the intensity at photodetector 120-1 and $I_{PD2}$ is the intensity at photodetector 102-2. The laser input power of optical signal 104 at each wavemeter 110 may be monitored as the sum of the outputs from photodetectors 120-1 and 120-2. Imbalance between photodetectors 120-1 and 120-2 may be calculated as $10 \times \log_{10}(I_{PD1}/I_{PD2})$. The total laser power may be calculated as the sum of the power detected at each photodetector 120 from all wavemeters 110.

Figure 16:
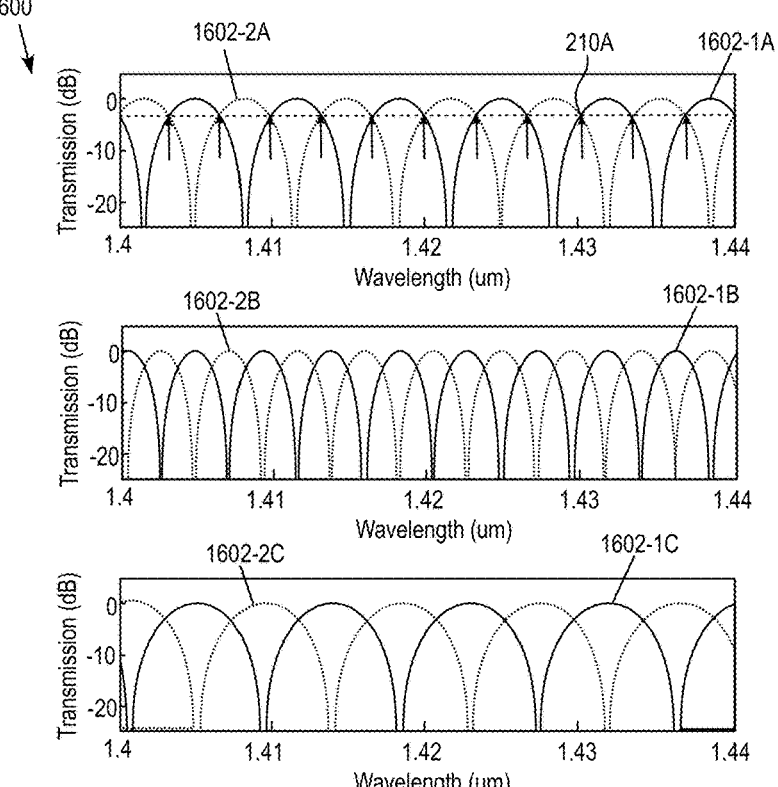
FIG. 16 is a graph of certain simulation results analyzing the example interferometric wavemeter system of FIG. 15 according to some embodiments of the present disclosure.

FIG. 16 is a graph of certain simulation results 1600 analyzing example interferometric wavemeter system 100 of FIG. 15 according to some embodiments of the present disclosure. With two photodetectors 120-1 and 120-2 at each wavemeter 110, not only does monitoring power slope 210 at the 3 dB point provide the maximum sensitivity over a wavelength range, it is also easier than with one photodetector 120 because the outputs from separate photodetectors 120-1 and 120-2 intersect approximately at the 3 dB, the quadrature point, so that detecting power slope 210 is easier to implement. Thus, power slopes 210 from each output will be mirror images of each other, enhancing the accuracy of detection. However, the cost of the equipment will be greater due to the additional photodetectors 120 used to achieve the greater accuracy. In the figure, outputs 1602-1*a* and 1602-2*a* from two photodetectors 120-1 and 120-2 of wavemeters 110*a* are shown, as also analogous outputs from other wavemeters 110*b* and 110*c* having different FSRs 212 as indicated.

Figure 17A:
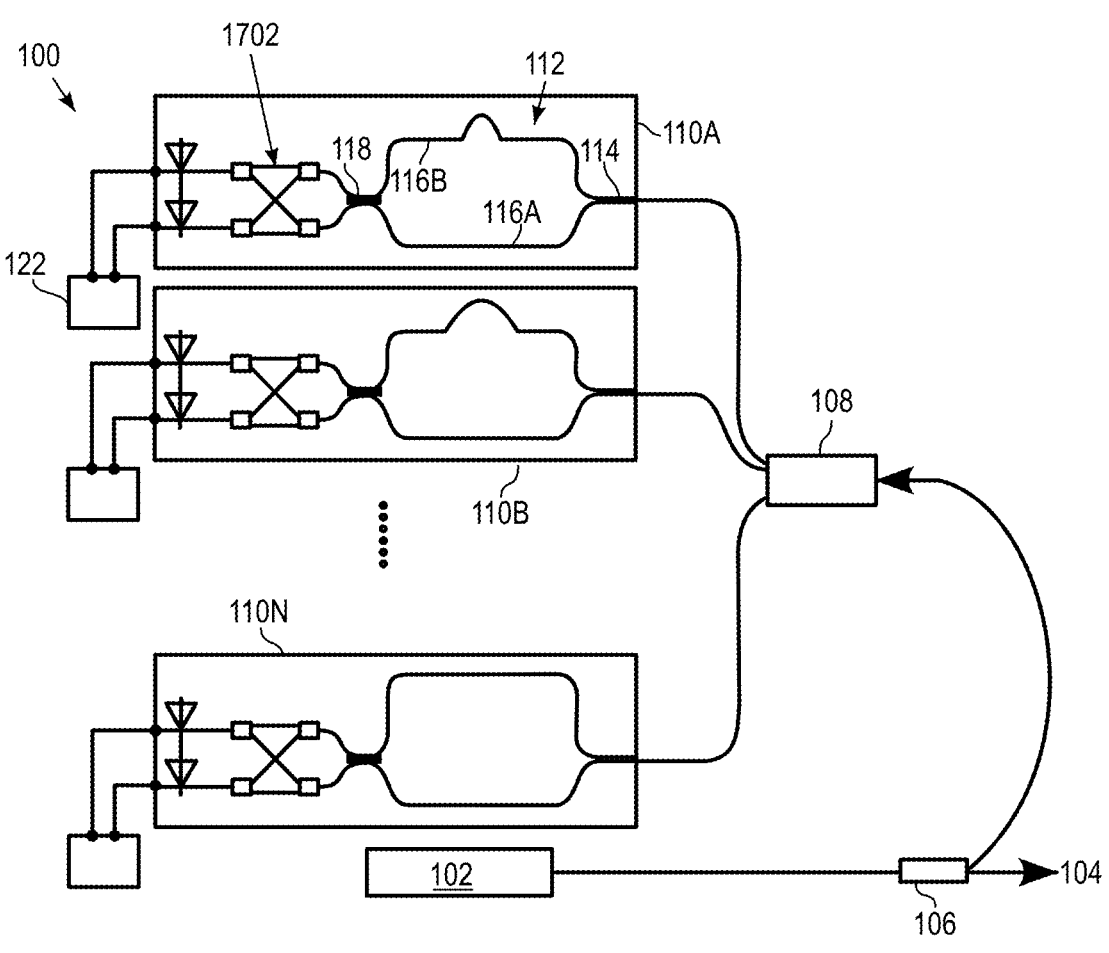
FIG. 17A is a simplified block diagram of yet another example configuration of an interferometric wavemeter system according to some embodiments of the present disclosure.

FIG. 17A is a simplified block diagram of yet another example configuration of interferometric wavemeter system 100 according to some embodiments of the present disclosure. Note that control circuit 124 is not shown merely for ease of illustration and not as a limitation. The embodiment shown is substantially similar to that shown in FIG. 3, except that a 90-degree hybrid optical detector 1702 is used instead of one photodetector 120 in each wavemeter 110. An integrated hybrid optical detector based on silicon photonics IC may be used in some embodiments. The use of the 90-degree hybrid optical detector 1702 in each wavemeter 110 allows extraction of the phase along with the wavelength and amplitude, leading to greater information retrieval and higher sensitivity and signal-to-noise ratio (SNR).

Figure 17B:
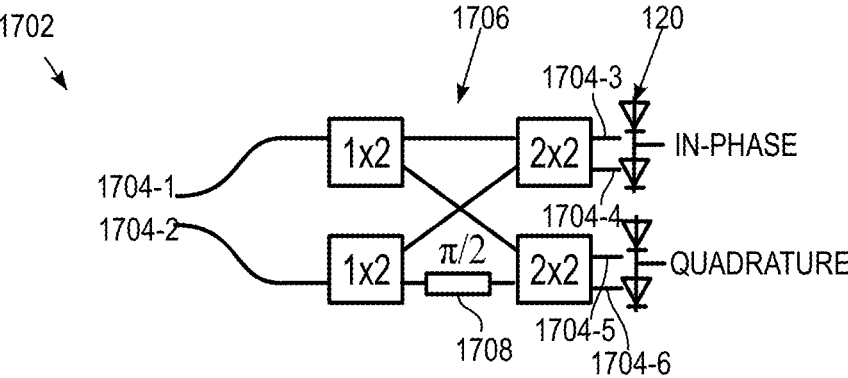
FIG. 17B is a simplified block diagram showing a detail in the interferometric wavemeter system of FIG. 17A according to some embodiments of the present disclosure.

FIG. 17B is a simplified block diagram showing 90-degree hybrid optical detector 1702 in more detail. 90-degree hybrid optical detector 1702 accepts two optical signals 1704-1 and 1704-2 and generates four output signals 1704-3, 1704-4, 1704-5 and 1704-6 that vary in amplitude and phases among them. An array of splitters (or couplers) 1706 and a phase shifter 17068 may be provided in the optical signal paths. For example, a 1×2 splitter may bifurcate the incoming optical signal into two pathways, each of which are sent to a 2×2 coupler and then to an array of photodetectors 120. Phase shifter 1708 may be provided in one of the optical pathways to add (or subtract) a phase difference of π/2 between a 1×2 splitter and a 2×2 coupler. These signals may be detected by two balanced receivers in array of photodetectors 120. Both the amplitude and the relative phase information between the input signals may be extracted using appropriate differential detection and digital signal processing.

Figure 18:
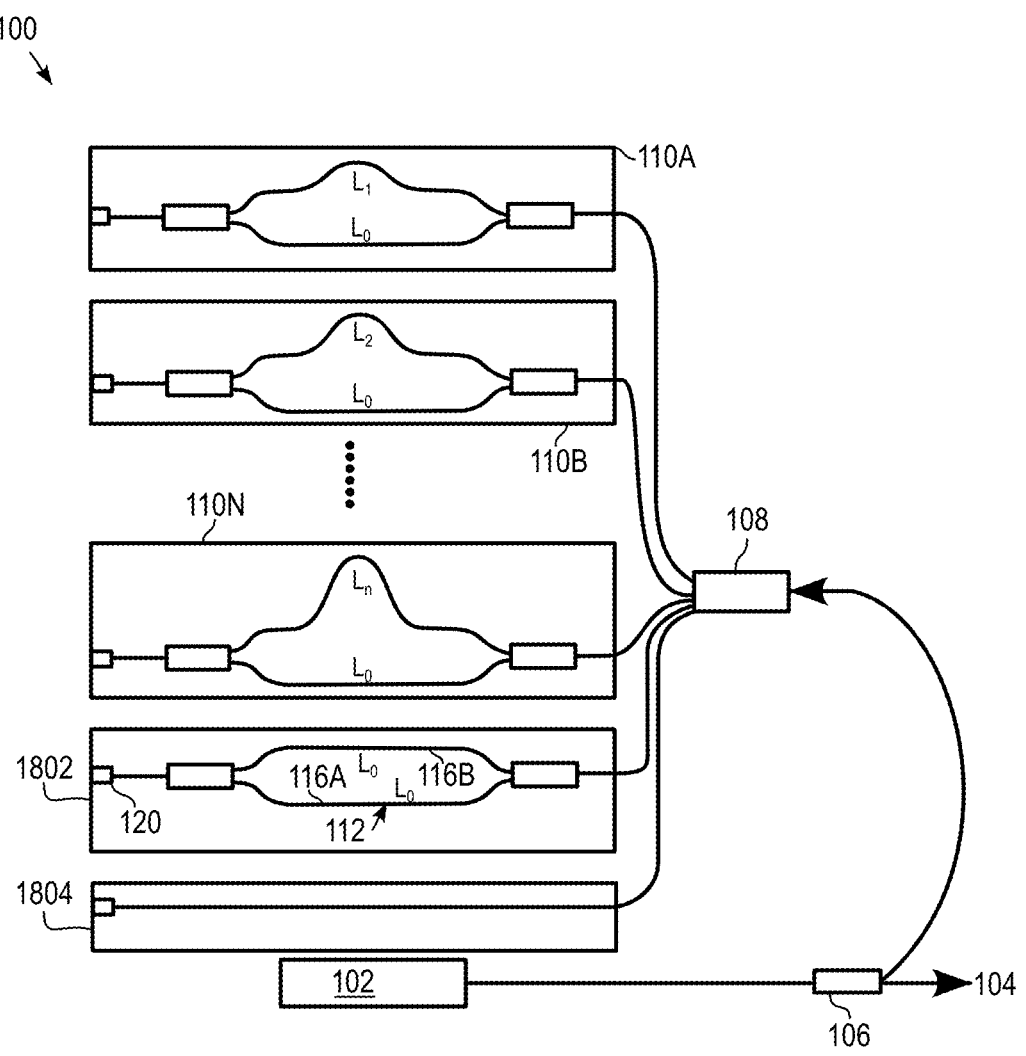
FIG. 18 is a simplified block diagram of yet another example configuration of an interferometric wavemeter system according to some embodiments of the present disclosure.

FIG. 18 is a simplified block diagram of yet another example configuration of interferometric wavemeter system 100 according to some embodiments of the present disclosure. Note that wavelength control loop 122 and control circuit 124 are not shown merely for ease of illustration and not as a limitation. In addition to the N wavemeters 110*a* . . . 110*n*, a phase calibration wavemeter 1802 may be provided to sense the phase difference in each wavemeter 110. Phase calibration wavemeter 1802 may have MZI 112 with the same arm lengths in reference arm 116*a* and sensing arm 116*b* so that the output phase difference is zero at photodetector 120. On the other hand, each wavemeter 110*a* . . . 110*n* may have different arm lengths for sensing as compared to the reference, leading to different phases at their respective outputs. The phases detected at the output of each wavemeter 110*a* . . . 110*n* may be compared with the phase detected at the output of phase calibration wavemeter 1802 for higher accuracy by self-calibration.

In some embodiments, a loss calibration port 1804 may also (or alternatively) be included. Loss calibration port 1802 may not have any splitter-combiner or couplers, leading to zero loss in optical signal strength between the input and the output. Comparing the outputs from individual wavemeters 110*a* . . . 110*n* with the output from loss calibration port 1804 can indicate the excess loss in each wavemeter 110 accurately without resorting to external measurements (i.e., external to interferometric wavemeter system 100).

Example Devices and Components

Figure 19:
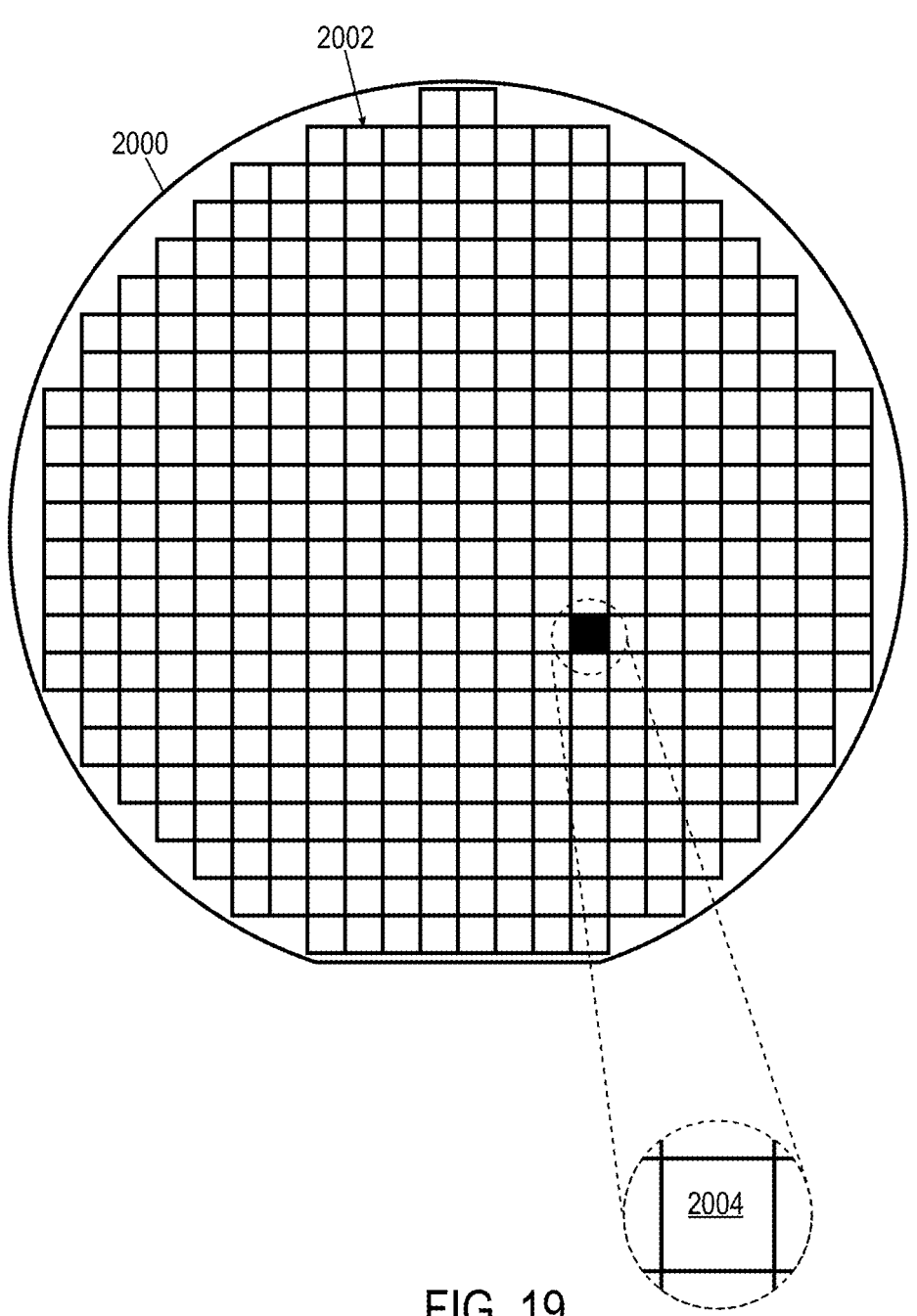
FIG. 19 shows a top view of a wafer and dies that may be included in a photonic system in accordance with at least one embodiment of this disclosure.
Figure 20:
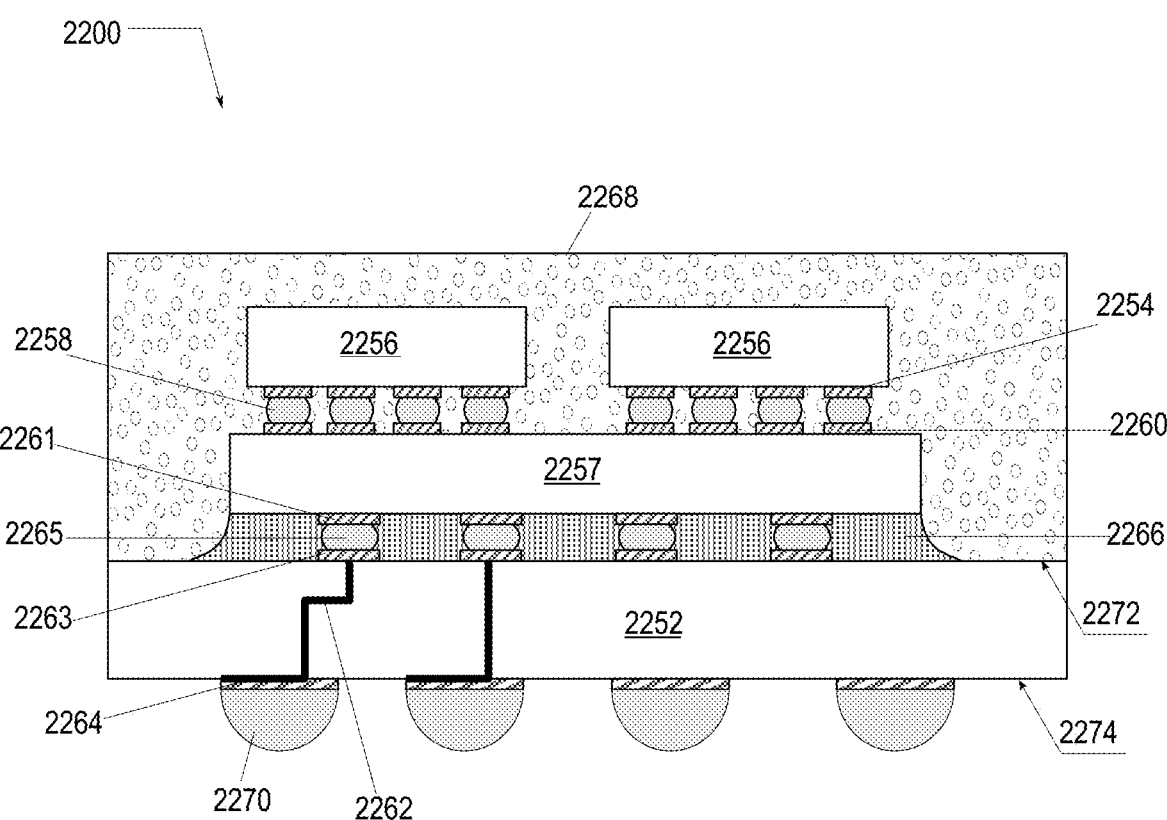
FIG. 20 is a cross-sectional side view of an integrated circuit device assembly that may include the example interferometric wavemeter system in accordance with at least one embodiment of this disclosure.
Figure 21:
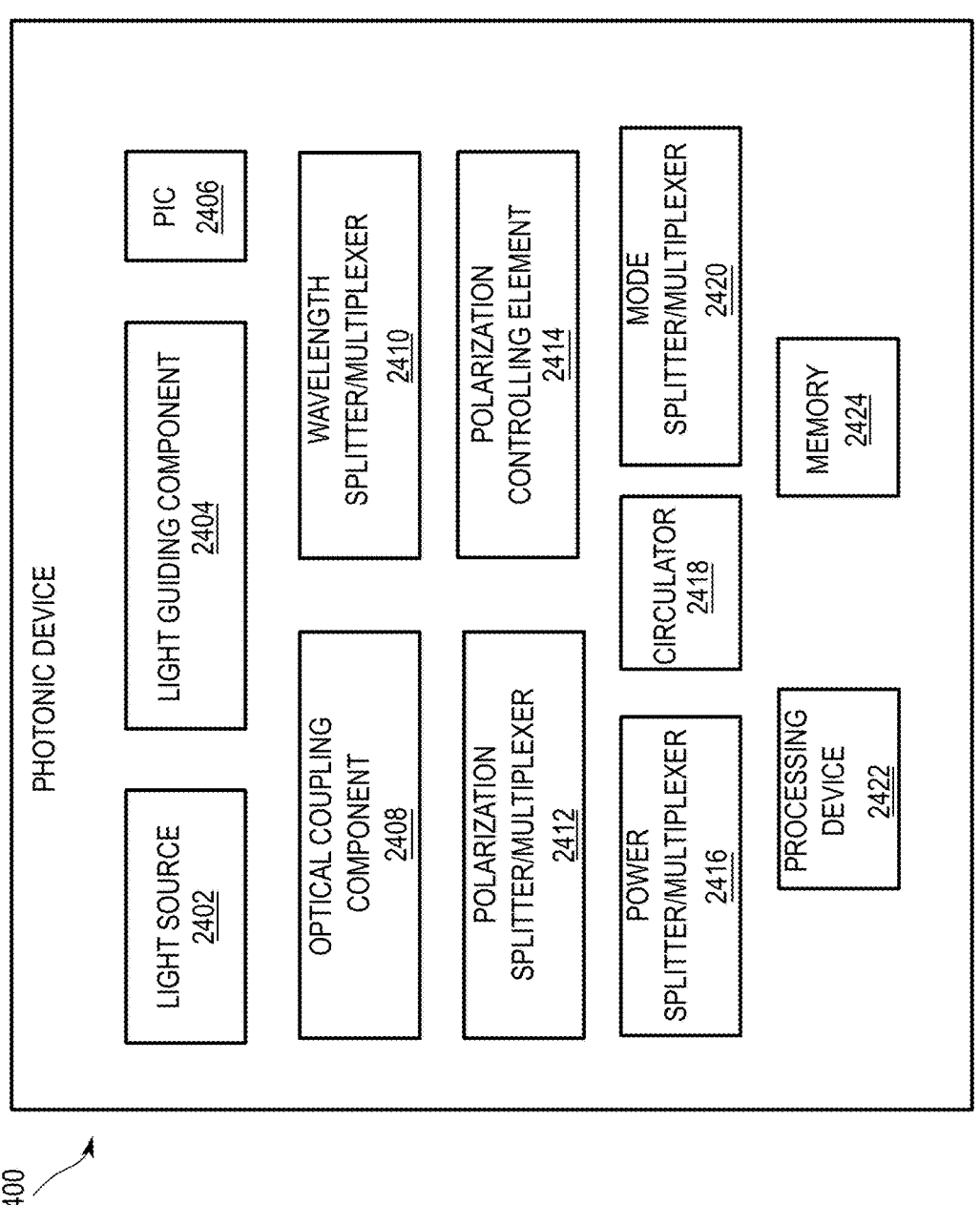
FIG. 21 is a block diagram of an example photonic device that may include the example interferometric wavemeter system, in accordance with any of the embodiments disclosed herein.

The structures disclosed herein, e.g., any of the embodiments shown in FIGS. 1-18 or any further embodiments described herein, may be included in any suitable electronic component. FIGS. 19-21 illustrate various examples of packages, assemblies, and devices that may be used with or include any of the wavemeters as disclosed herein.

FIG. 19 is a top view of a wafer 2000 and dies 2002 that may be included in any of the photonic systems disclosed herein with the low loss splitter-combiner. Wafer 2000 may be composed of semiconductor material and may include one or more dies 2002 having integrated circuit structures formed on a surface of wafer 2000. The individual dies 2002 may be a repeating unit of an integrated circuit product that includes any suitable integrated circuit. After the fabrication of the semiconductor product is complete, wafer 2000 may undergo a singulation process in which dies 2002 are separated from one another to provide discrete "chips" (e.g., example die 2004) of the integrated circuit product. Example die 2004 may include one or more transistors, supporting circuitry to route electrical signals to the transistors, passive components (e.g., signal traces, resistors, capacitors, or inductors), and/or any other integrated circuit components. In some embodiments, wafer 2000 or die 2004 may include a memory device (e.g., a random access memory (RAM) device, such as a static RAM (SRAM) device, a magnetic RAM (MRAM) device, a resistive RAM (RRAM) device, a conductive-bridging RAM (CBRAM) device, etc.), a logic device (e.g., an AND, OR, NAND, or NOR gate), or any other suitable circuit element. Multiple ones of these devices may be combined on a single die 2004. For example, a memory array formed by multiple memory devices may be formed on a same die 2004 as a processor unit (e.g., processing device 2422 of FIG. 21) or other logic that is configured to store information in memory devices or execute instructions stored in memory array. Various ones of the photonic systems disclosed herein may be manufactured using a die-to-wafer assembly technique in which some dies are attached to wafer 2000 that include others of dies and wafer 2000 is subsequently singulated.

FIG. 20 is a side, cross-sectional view of an example integrated circuit (IC) package 2200 that may be included in photonic systems as described in reference to the previous figures in accordance with any of the embodiments disclosed herein. In some embodiments, the IC package 2200 may be a system in package (SIP). As shown in the figure, package substrate 2252 may be formed of an insulator (e.g., a ceramic, a buildup film, an epoxy film having filler particles therein, etc.), and may have conductive pathways extending through the insulator between first face 2272 and second face 2274, or between different locations on first face 2272, and/or between different locations on second face 2274. These conductive pathways may take the form of any of the interconnect structures comprising lines and/or vias.

Package substrate 2252 may include conductive contacts 2263 that are coupled to conductive pathway 2262 through package substrate 2252, allowing circuitry within dies 2256 and/or interposer 2257 to electrically couple to various ones of conductive contacts 2264 (or to other devices included in package substrate 2252, not shown).

IC package 2200 may include interposer 2257 coupled to package substrate 2252 via conductive contacts 2261 of interposer 2257, first-level interconnects 2265, and conductive contacts 2263 of package substrate 2252. First-level interconnects 2265 illustrated in the figure are solder bumps, but any suitable first-level interconnects 2265 may be used, such as solder bumps, solder posts, or bond wires.

IC package 2200 may include one or more dies 2256 coupled to interposer 2257 via conductive contacts 2254 of dies 2256, first-level interconnects 2258, and conductive contacts 2260 of interposer 2257. Conductive contacts 2260 may be coupled to conductive pathways (not shown) through interposer 2257, allowing circuitry within dies 2256 to electrically couple to various ones of conductive contacts 2261 (or to other devices included in interposer 2257, not shown). First-level interconnects 2258 illustrated in the figure are solder bumps, but any suitable first-level interconnects 2258 may be used, such as solder bumps, solder posts, or bond wires. As used herein, a "conductive contact" may refer to a portion of electrically conductive material (e.g., metal) serving as an interface between different components; conductive contacts may be recessed in, flush with, or extending away from a surface of a component, and may take any suitable form (e.g., a conductive pad or socket).

In some embodiments, underfill material 2266 may be disposed between package substrate 2252 and interposer 2257 around first-level interconnects 2265, and mold 2268 may be disposed around dies 2256 and interposer 2257 and in contact with package substrate 2252. In some embodiments, underfill material 2266 may be the same as mold

2268. Example materials that may be used for underfill material 2266 and mold 2268 are epoxies as suitable. Second-level interconnects 2270 may be coupled to conductive contacts 2264. Second-level interconnects 2270 illustrated in the figure are solder balls (e.g., for a ball grid array (BGA) arrangement), but any suitable second-level interconnects 2270 may be used (e.g., pins in a pin grid array arrangement or lands in a land grid array arrangement). Second-level interconnects 2270 may be used to couple IC package 2200 to another component, such as a circuit board (e.g., a motherboard), an interposer, or another IC package, as known in the art.

In various embodiments, any of dies 2256 may be included in interferometric wavemeter system 100 as described herein. In embodiments in which IC package 2200 includes multiple dies 2256, IC package 2200 may be referred to as a multi-chip package (MCP). Dies 2256 may include circuitry to perform any desired functionality. For example, besides one or more of dies 2256 in interferometric wavemeter system 100 as described herein, one or more of dies 2256 may be logic dies (e.g., silicon-based dies), one or more of dies 2256 may be memory dies (e.g., HBM), etc. In some embodiments, any of dies 2256 may be implemented as discussed with reference to any of the previous figures. In some embodiments, at least some of dies 2256 may not include implementations as described herein.

Although IC package 2200 illustrated in the figure is a flip-chip package, other package architectures may be used. For example, IC package 2200 may be a BGA package, such as an embedded wafer-level ball grid array (eWLB) package. In another example, IC package 2200 may be a wafer-level chip scale package (WLCSP) or a panel fan-out (FO) package. Although two dies 2256 are illustrated in IC package 2200, IC package 2200 may include any desired number of dies 2256. IC package 2200 may include additional passive components, such as surface-mount resistors, capacitors, and inductors disposed over first face 2272 or second face 2274 of package substrate 2252, or on either face of interposer 2257. More generally, IC package 2200 may include any other active or passive components known in the art.

In some embodiments, no interposer 2257 may be included in IC package 2200; instead, dies 2256 may be coupled directly to conductive contacts 2263 at first face 2272 by first-level interconnects 2265.

FIG. 21 is a block diagram of an example photonic device 2400 that may include one or more components in which interferometric wavemeter system 100 as disclosed herein may be implemented. In addition, any suitable ones of the components of photonic device 2400 may include or be included in a die (e.g., die 2004 of FIG. 19) or one or more microelectronic packages (e.g., microelectronic packages 2200 of FIG. 20).

A number of components are illustrated in FIG. 21 as included in photonic device 2400, but any one or more of these components may be omitted or duplicated, as suitable for the application. In some embodiments, some or all of the components included in photonic device 2400 may be attached to one or more motherboards or any suitable support structure. In some embodiments, some or all of these components are fabricated onto a single system-on-chip (SoC) die.

In some embodiments, photonic device 2400 may include at least one light source 2402. Light source 2402 may include any suitable device for providing the necessary optical signals for various applications of photonic device 2400, ranging from communication to sensing and imaging.

Light source 2402 may be designed to emit light in a controlled and efficient manner to meet the specific requirements of photonic device 2400. In some embodiment, light source 2402 may be a coherent and monochromatic light source such as a laser (e.g., broadband laser 102), to produce light of a well-defined wavelength, low divergence, and high brightness. Examples of lasers that may be included in light source 2402 include semiconductor lasers, such as edge-emitting lasers and vertical-cavity surface-emitting lasers (VCSELs). Such lasers may be used in applications such as optical communication, sensing, and laser-based treatments in medical devices. In some embodiment, light source 2402 may be a non-coherent light source such as a light-emitting diode (LED) that emits light when an electric current is applied. LEDs may be simpler and more cost-effective than lasers, making them suitable for applications where high coherence is not required. Such LEDs may be used in applications such as displays, optical sensors, and short-distance communication systems. In further embodiments, light source 2402 may include one or more of a superluminescent diode (SLD), a quantum dot, a rare-earth-doped fiber/waveguide, a plasma source (e.g., plasmonics and microplasma devices), a microcavity resonators, or a nonlinear optical device (e.g., a photonic device that uses nonlinear optical processes, such as frequency doubling or parametric amplification, to generate new wavelengths).

In some embodiments, photonic device 2400 may include at least one light guiding component 2404, such as a waveguide, to manipulate and control the propagation of light. Light guiding component 2404 may include any suitable waveguide structures designed to confine and guide light along a specified path, allowing it to travel from one point to another with minimal loss and dispersion. Examples of waveguides that may be used as light guiding component 2404 include planar waveguides, optical fibers, photonic crystal waveguides, and rib waveguides. In some embodiments, light guiding component 2404 may include a material with a higher refractive index, known as the "core," surrounded by a material with a lower refractive index, known as the "cladding." The refractive index contrast between the core and cladding helps guide light within the core by using total internal reflection. Light is trapped within the core due to its reflection at the core-cladding interface. Light guiding component 2404 may support various modes of light propagation, such as single-mode or multimode.

In some embodiments, photonic device 2400 may include at least one PIC 2406. PIC 2406 may be a miniaturized and integrated optical device that incorporates photonic components, such as optical modulators, photodetectors, and waveguides, onto a single substrate. In some embodiments, PIC 2406 may include one or more optical modulators for encoding data onto an optical signal, e.g., onto light generated by light source 2402. Optical modulator of PIC 2406 may change certain properties of an optical signal, such as its amplitude, frequency, or phase, to encode information onto the signal or to perform various signal processing functions. Examples of optical modulators that may be implemented in PIC 2406 include electro-optic modulators, MZI modulators (e.g., such as MZI 112 in the described embodiments), or micro-ring modulators. In some embodiments, PIC 2406 may include one or more photodetectors (e.g., 120) for detecting and measuring the intensity of light or optical radiation across various wavelengths by converting incident light/photons into an electrical signal. Examples of photodetectors 120 that may be implemented in PIC 2406 include photodiodes, avalanche photodiodes, phototransistors, PIN diodes, CMOS image sensors, photomultiplier tubes, or quantum photodetectors. In some embodiments, PIC 2406 may include one or more waveguides, e.g., any of the waveguides described with reference to light guiding component 2404.

In some embodiments, photonic device 2400 may include at least one optical coupling component 2408. Optical coupling component 2408 may include any suitable structures designed to facilitate efficient transfer of light between different optical devices, e.g., between light source 2402 and light guiding component 2404, between light source 2402 and PIC 2406, between light guiding component 2404 and PIC 2406, or between light guiding component 2404 or PIC 2406 and a further transmission line such as a fiber (not shown in FIG. 21) that may be coupled to photonic device 2400. Examples of optical coupling elements that may be used to implement the optical coupling component 2408 include fiber couplers (e.g., fused fiber couplers or tapered fiber couplers), waveguide couplers, grating couplers, lens couplers, microlens couplers, prism couplers, fiber array couplers, or ball lens couplers. In various embodiments, wavemeter system 100 as described herein and at least some of the various components thereof may be implemented in PIC 2406.

In some embodiments, photonic device 2400 may include at least one wavelength splitter/multiplexer 2410, to combine or split multiple optical signals that are carried at different wavelengths. An example is where photonic device 2400 is used in an optical communication system such as a wavelength division multiplexing (WDM) system or a dense wavelength division multiplexing (DWDM) system, where multiple data channels are transmitted simultaneously over a single optical fiber using different wavelengths of light. In various embodiments, wavelength splitter/multiplexer 2410 may include a wavelength division multiplexer, a wavelength division demultiplexer, a passive optical add/drop multiplexer, an arrayed waveguide grating, a fused fiber couplers, and interleavers, or an optical filter based device.

In some embodiments, photonic device 2400 may include at least one polarization splitter/multiplexer 2412, to combine or split multiple optical signals depending on their polarization. Similarly, in some embodiments, photonic device 2400 may include at least one polarization controlling component 2414, to control polarization of light generated and manipulated in photonic device 2400. In various embodiments, polarization splitter/multiplexer 2412 and polarization controlling component 2414 may include any suitable structure to enable the manipulation and management of polarized light signals, such as birefringent materials, waveguide structures, or specialized coatings that interact differently with different polarization states.

In some embodiments, photonic device 2400 may include at least one general power splitter/multiplexer 2416, to combine or split multiple optical signals that in a manner that is not dependent on wavelength or polarization. For example, in some embodiments, power splitter/multiplexer 2416 may be used to tap off a portion of optical power for purposes or power monitoring in photonic device 2400, as in tap 106 in the described embodiments. Examples of devices that may be used as power splitter/multiplexer 2416 include directional couplers and multimode interference couplers.

In some embodiments, photonic device 2400 may include at least one circulator 2418, also referred to as a "directional splitter." Circulator 2418 may include any suitable device configured to direct light signals to travel in a specific, one-way circular path through its ports. In some embodiments, circulator 2418 may include magneto-optic materials or other techniques that create a Faraday rotation effect, where the polarization of light is rotated as it passes through circulator 2418.

In some embodiments, photonic device 2400 may include at least one mode splitter/multiplexer 2420, to combine or split multiple optical signals based on their guided modes. Examples of devices that may be used as a mode splitter/multiplexer 2420 include directional couplers, multimode interference couplers, tapered waveguide couplers, photonic lanterns, or photonic crystal splitters.

In some embodiments, photonic device 2400 may include a processing device 2422 (e.g., one or more processing devices). As used herein, the term "processing device" or "processor" may refer to any device or portion of a device that processes electronic data from registers and/or memory to transform that electronic data into other electronic data that may be stored in registers and/or memory. Processing device 2422 may include one or more digital signal processors (DSPs), application-specific integrated circuits (ASICs), central processing units (CPUs), graphics processing units (GPUs), cryptoprocessors (specialized processors that execute cryptographic algorithms within hardware), server processors, or any other suitable processing devices. In some embodiments, processing device 2422 may include circuitry to control operation of other components of photonic device 2400, e.g., to control operation of PIC 2406.

In some embodiments, photonic device 2400 may include a memory 2424, which may itself include one or more memory devices such as volatile memory (e.g., DRAM), nonvolatile memory (e.g., read-only memory (ROM)), flash memory, solid state memory, and/or a hard drive. In some embodiments, memory 2424 may include memory that shares a die with processing device 2422. This memory may be used as cache memory and may include embedded DRAM (eDRAM) or spin transfer torque magnetic random-access memory (MRAM). In some embodiments, memory 2424 may store instructions or data for processing device 2422 to control operation of other components of photonic device 2400, e.g., to control operation of PIC 2406.

In various embodiments, photonic device 2400 may not include one or more of the components illustrated in FIG. 14, but photonic device 2400 may include interface circuitry for coupling to the one or more components. For example, photonic device 2400 may not include a processing device 2422, but may include processing device interface circuitry (e.g., a connector and driver circuitry) to which processing device 2422 may be coupled. In another example, photonic device 2400 may not include memory 2424, but may include memory interface circuitry (e.g., connectors and supporting circuitry) to which memory 2424 may be coupled. In yet another example, photonic device 2400 may not include circulator 2418, but may include circulator interface circuitry (e.g., connectors) to which a circulator 2418 may be coupled.

SELECT EXAMPLES

Example 1 provides a photonic integrated circuit comprising: a laser source to generate an optical signal having one or more wavelengths; a tap to bifurcate a portion of the optical signal from the laser source; a splitter to split the bifurcated portion of the optical signal from the tap into a plurality of outgoing optical signals; a plurality of wavemeters coupled to the splitter in parallel, each one in the plurality to receive one of the outgoing optical signals from the splitter; and a control circuit to collate outputs from individual ones of the plurality of wavemeters to control the laser source, in which: the interferometric wavemeter system is configured for free spectral range (FSR) detuning, and each wavemeter in the plurality of wavemeters comprises: a Mach-Zehnder Interferometer (MZI); and a photodetector at an output of the MZI.

Example 2 provides the photonic integrated circuit of example 1, in which: the MZI in each wavemeter comprises two arms having an arm length difference between the two arms, and the FSR of each wavemeter is inversely proportional to the arm length difference.

Example 3 provides the photonic integrated circuit of example 2, in which different wavemeters in the plurality of wavemeters have correspondingly different arm length differences, such that a FSR of any wavemeter is different from another FSR of any other wavemeter in the plurality of wavemeters.

Example 4 provides the photonic integrated circuit of example 3, in which the FSR of any wavemeter differs from a first FSR of a first wavemeter in the plurality of wavemeters by an integer fraction of the first FSR.

Example 5 provides the photonic integrated circuit of any one of examples 1-4, in which: the photodetector is to measure a wavelength corresponding to a slope of optical power intensity at a quadrature point from peak intensity of the one of the outgoing optical signals from the splitter at the output of the MZI, and the slope is a measure of sensitivity of the corresponding wavemeter.

Example 6 provides the photonic integrated circuit of example 5, in which the sensitivity of each wavemeter varies inversely as the corresponding FSR.

Example 7 provides the photonic integrated circuit of any one of examples 1-5, in which a center wavelength of any one wavemeter is different from another center wavelength of any other wavemeter.

Example 8 provides the photonic integrated circuit of any one of examples 1-7, in which each wavemeter has a single photodetector at an output of the MZI.

Example 9 provides the photonic integrated circuit of any one of examples 1-7, in which each wavemeter has a plurality of photodetectors at an output of the MZI.

Example 10 provides the photonic integrated circuit of any one of examples 1-7, in which each wavemeter has a 90-degree hybrid optical detector at an output of the MZI.

Example 11 provides the photonic integrated circuit of any one of examples 1-10, in which the splitter to split the bifurcated portion of the optical signal from the tap comprises a star coupler.

Example 12 provides the photonic integrated circuit of any one of examples 1-10, in which the splitter to split the bifurcated portion of the optical signal from the tap comprises a series of Y-splitters.

Example 13 provides the photonic integrated circuit of any one of examples 1-10, in which the splitter to split the bifurcated portion of the optical signal from the tap comprises a multi-mode interference (MMI) coupler.

Example 14 provides the photonic integrated circuit of any one of examples 1-13, in which the plurality of wavemeters includes a phase calibration wavemeter.

Example 15 provides the photonic integrated circuit of any one of examples 1-14, in which the plurality of wavemeters includes a loss calibration port.

Example 16 provides the photonic integrated circuit of any one of examples 1-15, in which the wavemeters comprise silicon and compounds comprising at least one selection from silicon, oxygen, and nitrogen. In embodiments comprising athermal silicon-oxide, oxynitride and/or nitride, the wavemeters may be temperature insensitive.

Example 17 provides the photonic integrated circuit of any one of examples 1-16, in which the laser source is a broadband laser source to generate optical signals having wavelengths between 700 nm and 2500 nm.

Example 18 provides the photonic integrated circuit of any one of examples 1-17, further comprising a plurality of wavelength control loops, in which each wavelength control loop is between the control circuit and an output of a corresponding wavemeter.

Example 19 provides an interferometric wavemeter system comprising: a broadband laser source to generate an optical signal having one or more wavelengths; a tap to bifurcate a portion of the optical signal from the broadband laser source; a splitter to split the bifurcated portion of the optical signal from the tap into a plurality of outgoing optical signals; a plurality of wavemeters coupled to the splitter in parallel, each one in the plurality to receive one of the outgoing optical signals from the splitter; and a control circuit to collate outputs from individual ones of the plurality of wavemeters to control the broadband laser source, in which: the interferometric wavemeter system is configured for central wavelength detuning, and each wavemeter in the plurality of wavemeters comprises: a Mach-Zehnder Interferometer (MZI); and a photodetector at an output of the MZI.

Example 20 provides the interferometric wavemeter system of example 19, in which: the MZI in each wavemeter comprises two arms having an arm length difference between the two arms, and the FSR of each wavemeter is inversely proportional to the arm length difference.

Example 21 provides the interferometric wavemeter system of example 20, in which: different wavemeters have similar arm length differences, such that FSR of any one wavemeter is approximately same as FSR of any other wavemeters.

Example 22 provides the interferometric wavemeter system of any one of examples 19-21, in which the photodetector is to measure a wavelength at peak intensity of an optical signal at the output.

Example 23 provides the interferometric wavemeter system of any one of examples 19-22, in which a center wavelength of any one wavemeter is different from another center wavelength of any other wavemeter.

Example 24 provides the interferometric wavemeter system of example 23, in which: the center wavelength of any one wavemeter differs from a first center wavelength of a first wavemeter by an integer fraction of a difference between the first center wavelength and a second center wavelength of a second wavemeter in the plurality of wavemeters.

Example 25 provides the interferometric wavemeter system of any one of examples 19-24, in which each wavemeter has a single photodetector at an output of the MZI.

Example 26 provides the interferometric wavemeter system of any one of examples 19-24, in which each wavemeter has a plurality of photodetectors at an output of the MZI.

Example 27 provides the interferometric wavemeter system of any one of examples 19-24, in which each wavemeter has a 90-degree hybrid optical detector at an output of the MZI.

Example 28 provides the interferometric wavemeter system of any one of examples 19-27, in which the splitter to split the bifurcated portion of the optical signal from the tap comprises a star coupler.

Example 29 provides the interferometric wavemeter system of any one of examples 19-27, in which the splitter to split the bifurcated portion of the optical signal from the tap comprises a series of Y-splitters.

Example 30 provides the interferometric wavemeter system of any one of examples 19-27, in which the splitter to split the bifurcated portion of the optical signal from the tap comprises a multi-mode interference (MMI) coupler.

Example 31 provides the interferometric wavemeter system of any one of examples 19-30, in which the plurality of wavemeters includes a phase calibration wavemeter.

Example 32 provides the interferometric wavemeter system of any one of examples 19-31, in which the plurality of wavemeters includes a loss calibration port.

Example 33 provides the interferometric wavemeter system of any one of examples 19-32, in which the wavemeters comprise silicon and compounds comprising at least one selection from silicon, oxygen, and nitrogen. In embodiments comprising athermal silicon-oxide, oxynitride and/or nitride, the wavemeters may be temperature insensitive.

Example 34 provides the interferometric wavemeter system of any one of examples 19-33, in which the laser source is a broadband laser source to generate optical signals having wavelengths between 700 nm and 2500 nm.

Example 35 provides the interferometric wavemeter system of any one of examples 19-34, further comprising a plurality of wavelength control loops, in which each wavelength control loop is between the control circuit and an output of a corresponding wavemeter.

Example 36 provides a wavemeter in an interferometric wavemeter system, the wavemeter comprising: a splitter to split an incoming optical signal into a first optical signal and a second optical signal; a reference arm having a first arm length to facilitate propagation of the first optical signal; a sensing arm having a second arm length to facilitate propagation of the second optical signal; a combiner to join the first optical signal and the second optical signal into an output optical signal; and a photodetector to measure the output optical signal, in which: the second arm length is different from the first arm length, and the interferometric wavemeter system is configured for one of the following: (i) free spectral ranges (FSRs) of other wavemeters in the interferometric wavemeter system differ from an FSR of the wavemeter by an integer fraction of the FSR; and (ii) center wavelengths of other wavemeters in the interferometric wavemeter system differ from a center wavelength of the wavemeter by an integer fraction of a difference in center wavelengths of the wavemeter and another wavemeter.

Example 37 provides the wavemeter of example 36, further comprising another photodetector to measure the output optical signal.

Example 38 provides the wavemeter of example 36, further comprising a 90 degree hybrid optical detector to measure the output optical signal.

Example 39 provides the wavemeter of any one of examples 36-38, further comprising a wavelength control loop at an output of the photodetector.

Example 40 provides the wavemeter of any one of examples 36-39, in which the optical signal has wavelengths between 700 nm and 2500 nm.

The above description of illustrated implementations of the disclosure, including what is described in the abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize.

The invention claimed is:

1. A photonic integrated circuit, comprising:
a tap to bifurcate a portion of an optical signal from a laser source, the optical signal having one or more wavelengths;
a splitter to split the bifurcated portion of the optical signal from the tap into a plurality of outgoing optical signals;
a plurality of wavemeters coupled to the splitter in parallel, each one in the plurality to receive one of the outgoing optical signals from the splitter; and
a control circuit to collate outputs from individual ones of the plurality of wavemeters, wherein:
each wavemeter in the plurality of wavemeters comprises a Mach-Zehnder Interferometer (MZI),
  the MZI in each wavemeter comprises two arms having an arm length difference between the two arms,
  different wavemeters in the plurality of wavemeters have different arm length differences,
  a first wavemeter of the plurality of wavemeters has a first free spectral range ($FSR_1$),
  a second wavemeter of the plurality of wavemeters has a second free spectral range ($FSR_2$), $$FSR_2 = FSR_1 + m/n * FSR_1 \text{ or } FSR_2 = FSR_1 - m/n * FSR_1,$$

m is an integer other than zero, and
  n is equal to or smaller than a total number of wavemeters in the plurality of wavemeters.

2. The photonic integrated circuit of claim 1, wherein different wavemeters in the plurality of wavemeters have different free spectral ranges.

3. The photonic integrated circuit of claim 1, wherein:
each wavemeter in the plurality of wavemeters further includes a photodetector at an output of the MZI, and
the photodetector is to measure a wavelength corresponding to a slope of optical power intensity at a quadrature point from peak intensity of the one of the outgoing optical signals from the splitter at the output of the MZI.

4. The photonic integrated circuit of claim 3, wherein: the slope is a measure of sensitivity of a wavemeter.

5. The photonic integrated circuit of claim 1, wherein the laser source is a broadband laser source to generate optical signals having wavelengths between 700 nm and 2500 nm.

6. The photonic integrated circuit of claim 1, wherein the plurality of wavemeters includes a phase calibration wavemeter.

7. The photonic integrated circuit of claim 1, wherein the plurality of wavemeters includes a loss calibration port.

8. An interferometric wavemeter system, comprising:
a broadband laser source to generate an optical signal having one or more wavelengths;
a tap to bifurcate a portion of the optical signal from the broadband laser source;
a splitter to split the bifurcated portion of the optical signal from the tap into a plurality of outgoing optical signals;
a plurality of wavemeters coupled to the splitter in parallel, each one in the plurality to receive one of the outgoing optical signals from the splitter; and
a control circuit to collate outputs from individual ones of the plurality of wavemeters to control the broadband laser source, wherein:
  the plurality of wavemeters is configured for central wavelength detuning, and each wavemeter in the plurality of wavemeters comprises:
  a Mach-Zehnder Interferometer (MZI); and
  a photodetector at an output of the MZI.

9. The interferometric wavemeter system of claim 8, wherein:
the MZI in each wavemeter comprises two arms having an arm length difference between the two arms.

10. The interferometric wavemeter system of claim 9, wherein: different wavemeters have similar arm length differences.

11. The interferometric wavemeter system of claim 8, wherein the photodetector is to measure a wavelength at peak intensity of an optical signal at the output.

12. The interferometric wavemeter system of claim 8, wherein a center wavelength of any one wavemeter is different from another center wavelength of any other wavemeter.

13. The interferometric wavemeter system of claim 8, wherein: a center wavelength of any one wavemeter of the plurality of wavemeters differs from a first center wavelength of a first wavemeter of the plurality of wavemeters by an integer fraction of a difference between the first center wavelength and a second center wavelength of a second wavemeter of the plurality of wavemeters.

14. The interferometric wavemeter system of claim 8, wherein the plurality of wavemeters includes a phase calibration wavemeter.

15. The interferometric wavemeter system of claim 8, wherein the plurality of wavemeters includes a loss calibration port.

16. A photonic integrated circuit, comprising:
a tap to bifurcate a portion of an optical signal;
a splitter to split the bifurcated portion of the optical signal from the tap into a plurality of outgoing optical signals;
a plurality of wavemeters coupled to the splitter in parallel, each one in the plurality to receive one of the outgoing optical signals from the splitter; and
a control circuit to collate outputs from individual ones of the plurality of wavemeters, wherein:
  each wavemeter in the plurality of wavemeters comprises a Mach-Zehnder Interferometer (MZI),
  the MZI in each wavemeter comprises two arms having an arm length difference between the two arms,
  different wavemeters in the plurality of wavemeters have approximately equal arm length differences, and
  different wavemeters in the plurality of wavemeters have different center wavelengths.

17. The photonic integrated circuit of claim 16, wherein:
a first wavemeter of the plurality of wavemeters has a first center wavelength ($\lambda_1$),
a second wavemeter of the plurality of wavemeters has a second center wavelength ($\lambda_2$),
a third wavemeter of the plurality of wavemeters has a third center wavelength ($\lambda_3$), $$\lambda_3 = \lambda_1 + m/n * (\lambda_1 - \lambda_2),$$

m is an integer other than zero, and
n is equal to or smaller than a total number of wavemeters in the plurality of wavemeters.

18. The photonic integrated circuit of claim 17, wherein m is smaller than n.

19. The photonic integrated circuit of claim 16, wherein different wavemeters in the plurality of wavemeters have approximately equal free spectral ranges (FSRs).

20. The photonic integrated circuit of claim 16, wherein the plurality of wavemeters includes a phase calibration wavemeter.

\* \* \* \* \*